United States Patent
Liu et al.

(10) Patent No.: US 11,297,585 B2
(45) Date of Patent: Apr. 5, 2022

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/889,743

(22) Filed: Jun. 1, 2020

(65) Prior Publication Data

US 2020/0314787 A1    Oct. 1, 2020

Related U.S. Application Data

(63) Continuation of application No. PCT/CN2017/114829, filed on Dec. 6, 2017.

(51) Int. Cl.
| | |
|---|---|
| H04W 56/00 | (2009.01) |
| H04L 1/00 | (2006.01) |
| H04W 92/10 | (2009.01) |

(52) U.S. Cl.
CPC ....... *H04W 56/0045* (2013.01); *H04L 1/0029* (2013.01); *H04W 92/10* (2013.01)

(58) Field of Classification Search
CPC . H04W 56/0045; H04W 56/00; H04W 92/10; H04W 84/06; H04L 1/0029
See application file for complete search history.

(56) References Cited

U.S. PATENT DOCUMENTS

| | | | |
|---|---|---|---|
| 2004/0202119 A1 | 10/2004 | Edge | |
| 2019/0174516 A1* | 6/2019 | Shimezawa | ....... H04W 72/1263 |
| 2020/0412431 A1* | 12/2020 | Park | ....... H04B 7/0469 |

FOREIGN PATENT DOCUMENTS

| | | | |
|---|---|---|---|
| CN | 102448162 A | 5/2012 | |
| CN | 102469046 A | 5/2012 | |
| CN | 106488546 A | 3/2017 | |

OTHER PUBLICATIONS

ISR received in application No. PCT/CN2017/114829 dated Jul. 17, 2018.

(Continued)

*Primary Examiner* — Jianye Wu

(57) ABSTRACT

The present disclosure provides a method and a device in a communication node for wireless communications. The communication node in the present disclosure first receives first information, then receives second information, and then transmits a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size size corresponding to the first transmission timing adjustment is not equal to a minimum step-size size corresponding to the second transmission timing adjustment; the first information, the second information and the first radio signal are all transmitted through an air interface. The disclosure can support large-delay-transmission and reduce overhead for configuring signaling of Time Advance (TA).

20 Claims, 15 Drawing Sheets

(56) References Cited

OTHER PUBLICATIONS

3rd Generation Partnership Project. "Technical Specification Group Radio Access Network; Study on New Radio (NR) to Support Non Terrestrial Networks (Release 15)" 3GPP TR 38.811V0.2.1, Nov. 30, 2017 (Nov. 30, 2017).

* cited by examiner

| Subcarrier Spacing | First-stage Minimum Step-size | Second-stage Minimum Step-size |
|---|---|---|
| 15 | 100ms | 16*64 Ts |
| 30 | 200ms | 8*64 Ts |
| 60 | 300ms | **4*64 Ts** |
| 120 | 350ms | 2*64 Ts |

FIG. 9

| Q2= 8 consecutive non-negative integers | Q2= 8 candidate integers | Q2= 8 candidate adjustments |
|---|---|---|
| 0 | -4 | $-4\delta_2$ |
| 1 | -3 | $-3\delta_2$ |
| 2 | -2 | $-2\delta_2$ |
| 3 | -1 | $-1\delta_2$ |
| 4 | 0 | 0 |
| 5 | 1 | $1\delta_2$ |
| 6 | 2 | $2\delta_2$ |
| 7 | 3 | $3\delta_2$ |

FIG. 10

| X=2 | |
|---|---|
| #1 integer set | #2 integer set |
| {0, 1, 2, ..., 31} | {0, 1, 2, ..., 63} |

FIG. 11

| Q1=4 candidate integers | Q1=4 candidate adjustments |
|---|---|
| 1 | $1\delta_1$ |
| 3 | $3\delta_1$ |
| 4 | $4\delta_1$ |
| 5 | $5\delta_1$ |

FIG. 12

METHOD AND DEVICE IN COMMUNICATION NODE USED FOR WIRELESS COMMUNICATION

CROSS REFERENCE TO RELATED APPLICATIONS

This application is a continuation of International Application No. PCT/CN2017/114829, filed on Dec. 6, 2017, claiming the priority benefit of International Application PCT/CN2017/114829, filed on Dec. 6, 2017, the full disclosure of which is incorporated herein by reference.

BACKGROUND

Technical Field

The present disclosure relates to a transmission method and device in a wireless communication system and in particular to a transmission scheme and device in non-terrestrial wireless communications.

Related Art

The disclosure scenarios of wireless communication systems will become increasingly diverse in the future, and different disclosure scenarios put forward different performance requirements on the system. In order to meet the different performance requirements of various application scenarios, the research on New Radio (NR), or what is called Fifth Generation (5G), is decided to be conducted at the 3rd Generation Partner Project (3GPP) Radio Access Network (RAN) #72 plenary meeting, and the Work Item (WI) of NR was approved at the 3GPP RAN #75 plenary meeting to standardize NR.

In order to adapt to various application scenarios and meet different requirements, a research project on Non-Terrestrial Networks (NTN) under NR was also approved at the 3GPP RAN #75 plenary meeting. The research project started in version R15, and then started WI in version R16 to standardize related techniques.

SUMMARY

In Non-Terrestrial Networks (NTN), a User Equipment (UE) is in communication with a satellite or an aircraft via 5G network. Due to the distance from the satellite or the aircraft to the UE is larger than that from a terrestrial base station to the UE, a longer Propagation Delay is incurred in communications between the satellite or the aircraft and the UE. In addition, when a satellite is used as a relay equipment of a terrestrial base station, a delay in a Feeder Link between the satellite and the terrestrial base station will further increase transmission delay between a UE and a base station. In the existing Long Term Evolution (LTE) or 5G NR system, in order to ensure the synchronization of the uplink transmission, so as to avoid the interference between users and reduce the scheduling complexity, a network equipment will configure a Timing Advance (TA) for uplink transmissions from a UE according to propagation delay. Because the existing TA configuration is designed for traditional terrestrial communications, which cannot be directly applied to NTN network, so a new design is needed to support NTN communications.

The disclosure provides a solution to the problem of uplink timing adjustment in NR NTN communications. It should be noted that embodiments and characteristics of the embodiments of a base station in the present disclosure may be applied to a UE if no conflict is incurred, and vice versa. Further, the embodiments and the characteristics of the embodiments in the present disclosure may be mutually combined if no conflict is incurred.

The present disclosure provides a method in a first-type communication node for wireless communication, comprising:

receiving first information;
receiving second information; and
transmitting a first radio signal;

wherein the first information is used to determine a first transmission timing adjustment, the second information is used to determine a second transmission timing adjustment, and a start time for transmission of the first radio signal is related to both the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

According to one aspect of the present disclosure, the above method is characterized in that the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

According to one aspect of the present disclosure, the above method is characterized in further comprising:

receiving third information;

wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface.

According to one aspect of the present disclosure, the above method is characterized in that at least the latter of the minimum step-size corresponding to the first transmission timing adjustment and the minimum step-size corresponding to the second transmission timing adjustment is related to a sub-carrier spacing of sub-carriers occupied by the first radio signal.

According to one aspect of the present disclosure, the above method is characterized in that the Q2 candidate adjustments are obtained by respectively multiplying Q2 candidate integers by the minimum step-size corresponding to the second transmission timing adjustment, and the Q2 candidate integers are obtained by respectively subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment.

According to one aspect of the present disclosure, the above method is characterized in further comprising:

receiving fourth information;

wherein the Q2 consecutive non-negative integers belong to a first integer set, and the fourth information is used to determine the first integer set in X integer sets, the X being a positive integer greater than 1; each of the X integer sets comprises a positive integer number of non-negative integer (s), the X integer sets being predefined, and the fourth information is transmitted through the air interface.

According to one aspect of the present disclosure, the above method is characterized in that the Q1 candidate adjustments are predefined; or the Q1 candidate adjustments are obtained by respectively multiplying the Q1 candidate integers by the minimum step-size corresponding to the first transmission timing adjustment; the first information indicates a candidate integer generating the first transmission timing adjustment in the Q1 candidate integers, the Q1 candidate integers all being non-negative values.

According to one aspect of the present disclosure, the above method is characterized in further comprising:

receiving fifth information;

wherein the fifth information is used to determine whether the minimum step-size corresponding to the first transmission timing adjustment is equal to the minimum step-size corresponding to the second transmission timing adjustment, and the fifth information is transmitted through the air interface.

According to one aspect of the present disclosure, the above method is characterized in further comprising:

transmitting a second radio signal;

wherein the second radio signal is used to determine at least one of a start time for a transmission of the first information and a start time for a transmission of the second information, and the second radio signal is transmitted through the air interface.

The present disclosure provides a method in a second communication node for wireless communication, comprising:

transmitting first information;

transmitting second information; and receiving a first radio signal;

wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

According to one aspect of the present disclosure, the above method is characterized in that the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

According to one aspect of the present disclosure, the above method is characterized in further comprising:

transmitting third information;

wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface.

According to one aspect of the present disclosure, the above method is characterized in that at least the latter of the minimum step-size corresponding to the first transmission timing adjustment and the minimum step-size corresponding to the second transmission timing adjustment is related to a sub-carrier spacing of sub-carriers occupied by the first radio signal.

According to one aspect of the present disclosure, the above method is characterized in that the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment.

According to one aspect of the present disclosure, the above method is characterized in further comprising:

transmitting fourth information;

wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

According to one aspect of the present disclosure, the above method is characterized in that the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers all being non-negative values.

According to one aspect of the present disclosure, the above method is characterized in further comprising:

transmitting fifth information;

wherein the fifth information is used to determine whether the minimum step-size corresponding to the first transmission timing adjustment is equal to the minimum step-size corresponding to the second transmission timing adjustment, and the fifth information is transmitted through the air interface.

According to one aspect of the present disclosure, the above method is characterized in further comprising:

receiving a second radio signal;

wherein the second radio signal is used to determine at least one of a start time for a transmission of the first information or a start time for a transmission of the second information, and the second radio signal is transmitted through the air interface.

The present disclosure provides a first-type communication node device for wireless communication, comprising:
  a first receiver, receiving first information;
  a second receiver, receiving second information; and
  a first transmitter, transmitting a first radio signal;
  wherein the first information is used to determine a first transmission timing adjustment, and the second information is used to determine a second transmission timing adjustment; a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

According to one aspect of the present disclosure, the above first-type communication node is characterized in that the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

According to one aspect of the present disclosure, the above first-type communication node is characterized in that the second receiver also receives third information; wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface.

According to one aspect of the present disclosure, the above first-type communication node is characterized in that at least the latter of the minimum step-size corresponding to the first transmission timing adjustment and the minimum step-size corresponding to the second transmission timing adjustment is related to a sub-carrier spacing of sub-carriers occupied by the first radio signal.

According to one aspect of the present disclosure, the above first-type communication node is characterized in that the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment.

According to one aspect of the present disclosure, the above first-type communication node is characterized in that the second receiver also receives fourth information; wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

According to one aspect of the present disclosure, the above first-type communication node is characterized in that the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers all being non-negative values.

According to one aspect of the present disclosure, the above first-type communication node is characterized in that the first receiver also receives fifth information; wherein the fifth information is used to determine whether the minimum step-size corresponding to the first transmission timing adjustment is equal to the minimum step-size corresponding to the second transmission timing adjustment, and the fifth information is transmitted through the air interface.

According to one aspect of the present disclosure, the above first-type communication node is characterized in that the first transmitter also transmits a second radio signal; wherein the second radio signal is used to determine at least one of a start time for a transmission of the first information or a start time for a transmission of the second information, and the second radio signal is transmitted through the air interface.

The present disclosure provides a second-type communication node for wireless communication, comprising:
  a second transmitter, transmitting first information;
  a third transmitter, transmitting second information; and
  a third receiver, receiving a first radio signal;
  wherein the first information is used to determine a first transmission timing adjustment, and the second information is used to determine a second transmission timing adjustment; a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

According to one aspect of the present disclosure, the above second-type communication node is characterized in that the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

According to one aspect of the present disclosure, the above second-type communication node is characterized in that the third transmitter also transmits third information; wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface.

According to one aspect of the present disclosure, the above second-type communication node is characterized in that at least the latter of the minimum step-size corresponding to the first transmission timing adjustment and the minimum step-size corresponding to the second transmission timing adjustment is related to a sub-carrier spacing of sub-carriers occupied by the first radio signal.

According to one aspect of the present disclosure, the above second-type communication node is characterized in that the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment.

According to one aspect of the present disclosure, the above second-type communication node is characterized in that the third transmitter also transmits fourth information; wherein the Q2 consecutive non-negative integers belong to a first integer set, and the fourth information is used to determine the first integer set in X integer sets, the X being a positive integer greater than 1; each of the X integer sets comprises a positive integer number of non-negative integer(s), the X integer sets being predefined, and the fourth information is transmitted through the air interface.

According to one aspect of the present disclosure, the above second-type communication node is characterized in that the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers all being non-negative values.

According to one aspect of the present disclosure, the above second-type communication node is characterized in that the second transmitter also transmits fifth information; wherein the fifth information is used to determine whether the minimum step-size corresponding to the first transmission timing adjustment is equal to the minimum step-size corresponding to the second transmission timing adjustment, and the fifth information is transmitted through the air interface.

According to one aspect of the present disclosure, the above second-type communication node is characterized in that the third receiver also receives a second radio signal; wherein the second radio signal is used to determine at least one of a start time for a transmission of the first information or a start time for a transmission of the second information, and the second radio signal is transmitted through the air interface.

In one embodiment, the present disclosure is advantageous in the following aspects:

the present disclosure provides a two-stage TA adjustment method; the first stage is adjusting the TA according to a coarse granularity so as to ensure the coarse synchronization of uplink transmissions, and the second stage is adjusting the TA according to a fine granularity so as to ensure the uplink fine synchronization (the general synchronization error is within the scope of the cyclic prefix). This method can reduce the overhead and complexity of TA adjustment while ensuring the flexibility of base station scheduling.

The two-stage TA adjustment method provided in the present disclosure also supports the network in notifying a reference TA adjustment (such as satellite-based height and a delay in a Feeder Link, etc.), and then using a traditional TA adjustment signaling to fine tune the reference TA, which can greatly reduce the signaling overhead of TA adjustment and try to maintain the existing design in 5G NR at the same time.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of the relations among the minimum step-size corresponding to a first transmission timing adjustment, the minimum step-size corresponding to a second transmission timing adjustment and a sub-carrier spacing of sub-carriers occupied by a first radio signal according to one embodiment of the present disclosure;

FIG. 10 illustrates a schematic diagram of obtaining Q2 candidate adjustments according to one embodiment of the present disclosure;

FIG. 11 illustrates a schematic diagram of X integer sets according to one embodiment of the present disclosure;

FIG. 12 illustrates a schematic diagram of the relationship between Q1 candidate adjustments and Q1 candidate integers according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
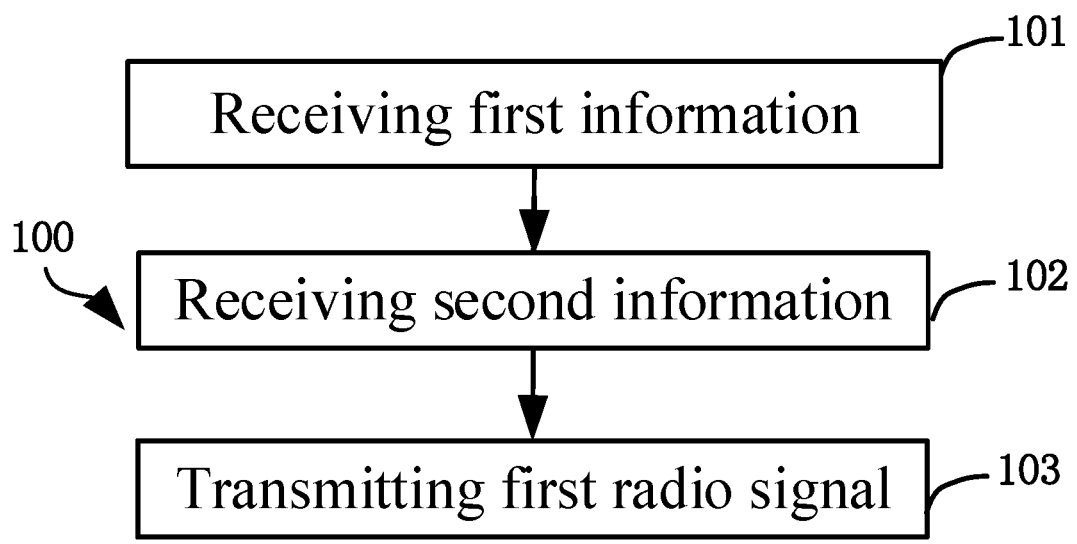
FIG. 1 illustrates a flowchart of first information, second information and a first radio signal according to one embodiment of the present disclosure.

Embodiment 1 illustrates a flowchart of transmission of first information, second information, and a first radio signal according to one embodiment of the present disclosure, as shown in FIG. 1. In FIG. 1, each box represents a step. In Embodiment 1, the first-type communication node in the present disclosure first receives first information, then receives second information, and then transmits a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, a transmitter of the first radio signal assumes that an uplink timing of a radio signal transmitted before the second information received through the air interface is accurate.

In one embodiment, a transmitter of the first radio signal assumes that a radio signal transmitted before the second information is received through the air interface will not cause interference to a radio signal transmitted by other first-type communication nodes.

In one embodiment, a transmitter of the first radio signal assumes that a radio signal transmitted before the second information is received through the air interface will not cause Inter-Carrier Interference (ICI).

In one embodiment, a receiver of the first radio signal uses longer search time than when receiving the first radio signal to receive a radio signal before the second information through the air interface.

In one embodiment, before receiving the second information, the first-type communication node will not transmit any radio signal other than a Physical Random Access Channel (PRACH) through the air interface.

In one embodiment, before receiving the second information, the first-type communication node transmits a radio signal other than a Physical Random Access Channel (PRACH) through the air interface.

In one embodiment, a receiver of the first radio signal avoids interference between uplink transmissions from different first-type communication nodes by scheduling before transmitting the second information.

In one embodiment, a receiver of the first radio signal determines a start time of a radio signal transmitted through the air interface before the second information only according to the first transmission timing adjustment.

In one embodiment, the first transmission timing adjustment and the second transmission timing adjustment are both real numbers in the case of units are respectively given.

In one embodiment, the minimum step-size corresponding to the first transmission timing adjustment and the minimum step-size corresponding to the second transmission timing adjustment are all real numbers in the case of units are respectively given.

In one embodiment, the first transmission timing adjustment is a non-negative number.

In one embodiment, the second transmission timing adjustment is a non-negative number.

In one embodiment, the second transmission timing adjustment is a negative number.

In one embodiment, the second transmission timing adjustment is equal to 0.

In one embodiment, a unit of measurement of the minimum step-size corresponding to the first transmission timing adjustment is the same as that of the minimum step-size corresponding to the second transmission timing adjustment.

In one embodiment, a unit of measurement of the minimum step-size corresponding to the first transmission timing adjustment is different from that of the minimum step-size corresponding to the second transmission timing adjustment.

In one embodiment, a unit of measurement of the first transmission timing adjustment is the same as that of the second transmission timing adjustment.

In one embodiment, a unit of measurement of the first transmission timing adjustment is different from that of the second transmission timing adjustment.

In one embodiment, a unit of measurement of the first transmission timing adjustment is the same as that of the minimum step-size corresponding to the first transmission timing adjustment.

In one embodiment, a unit of measurement of the second transmission timing adjustment is the same as that of the minimum step-size corresponding to the second transmission timing adjustment.

In one embodiment, the first transmission timing adjustment is measured by millisecond.

In one embodiment, the minimum step-size corresponding to the first transmission timing adjustment is measured by millisecond.

In one embodiment, the first transmission timing adjustment is measured by microsecond.

In one embodiment, the minimum step-size corresponding to the first transmission timing adjustment is measured by microsecond.

In one embodiment, the second transmission timing adjustment is measured by microsecond.

In one embodiment, the minimum step-size corresponding to the second transmission timing adjustment is measured by microsecond.

In one embodiment, the second transmission timing adjustment is measured by millisecond.

In one embodiment, the minimum step-size corresponding to the second transmission timing adjustment is measured by millisecond.

In one embodiment, the phrase that the minimum step-size corresponding to the first transmission timing adjustment is not equal to the minimum step-size corresponding to the second transmission timing adjustment refers to: when the minimum step-size corresponding to the first transmission timing adjustment and the minimum step-size corresponding to the second transmission timing adjustment are converted into a same unit of measurement, the minimum step-size corresponding to the first transmission timing adjustment is not equal to the minimum step-size corresponding to the second transmission timing adjustment.

In one embodiment, when the minimum step-size corresponding to the first transmission timing adjustment and the minimum step-size corresponding to the second transmission timing adjustment are converted into a same unit of measurement, the minimum step-size corresponding to the first transmission timing adjustment is greater than the minimum step-size corresponding to the second transmission timing adjustment.

In one embodiment, when the minimum step-size corresponding to the first transmission timing adjustment and the minimum step-size corresponding to the second transmission timing adjustment are converted into a same unit of measurement, the minimum step-size corresponding to the first transmission timing adjustment is smaller than the minimum step-size corresponding to the second transmission timing adjustment.

In one embodiment, when the first transmission timing adjustment and the second transmission timing adjustment are converted into a same unit of measurement, the first transmission timing adjustment is greater than the second transmission timing adjustment.

In one embodiment, when the first transmission timing adjustment and the second transmission timing adjustment are converted into a same unit of measurement, the first transmission timing adjustment is smaller than the second transmission timing adjustment.

In one embodiment, the first information indicates the first transmission timing adjustment.

In one embodiment, the second information indicates the second transmission timing adjustment.

In one embodiment, the minimum step-size corresponding to the first transmission timing adjustment is an absolute difference of minimum change that the first transmission timing adjustment can afford.

In one embodiment, the minimum step-size corresponding to the second transmission timing adjustment is an absolute difference of minimum change that the second transmission timing adjustment can afford.

In one embodiment, the first information is transmitted through a Physical Broadcast Channel (PBCH).

In one embodiment, the first information comprises one or more Fields of a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more Fields of a System Information Block (SIB).

In one embodiment, the first information comprises one or more Fields of Remaining System Information (RMSI).

In one embodiment, the first information comprises all or part of a Radio Resource Control (RRC) signaling.

In one embodiment, the first information comprises all or part of a Random Access Response (RAR).

In one embodiment, the first information comprises all or part of Msg-2 (Message-2 in random access process).

In one embodiment, the first information comprises all or part of Timing Advance (TA) command.

In one embodiment, the first information comprises all or part of a Medium Access Control (MAC) signaling.

In one embodiment, the first information comprises all or part of a MAC Protocol Data Unit (PDU).

In one embodiment, the second information is transmitted through a Downlink Shared Channel (DL-SCH).

In one embodiment, the second information is transmitted through a Physical Downlink Shared Channel (PDSCH).

In one embodiment, the second information comprises all or part of a Random Access Response (RAR).

In one embodiment, the second information comprises all or part of Msg-2 (Message-2 in random access process).

In one embodiment, the second information comprises all or part of a Timing Advance (TA) update.

In one embodiment, the second information comprises all or part of a Medium Access Control (MAC) signaling.

In one embodiment, the second information comprises all or part of a MAC Control Element (CE).

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal carries all or part of Msg-3 (Message-3 in random access process).

In one embodiment, the first radio signal is generated by a first bit block successively through Segmentation, Channel Coding, Rate Matching, Concatenation, Scrambling, Modulation, Layer Mapping, Precoding, Resource Mapping, Baseband Signal Generation and Upconversion, and the first bit block comprises all or part of bits in a Transport Block.

In one embodiment, the start time for the transmission of the first radio signal is linearly related to the first transmission timing adjustment and the second transmission timing adjustment.

In one embodiment, the start time for the transmission of the first radio signal is positively linear with the first transmission timing adjustment.

In one embodiment, the start time for the transmission of the first radio signal is negatively linear with the first transmission timing adjustment.

In one embodiment, the start time for the transmission of the first radio signal is positively linear with the second transmission timing adjustment.

In one embodiment, the start time for the transmission of the first radio signal is negatively linear with the second transmission timing adjustment.

In one embodiment, the first transmission timing adjustment and the second transmission timing adjustment determine the start time for the transmission of the first radio signal through a given mapping relationship.

In one embodiment, the air interface is wireless.

In one embodiment, the air interface comprises a wireless channel.

In one embodiment, the air interface is an interface between a second-type communication node and a first-type communication node.

In one embodiment, the air interface is a Uu interface.

In one embodiment, the first transmission timing adjustment is related to a height of a receiver of the first radio signal.

In one embodiment, the first transmission timing adjustment is related to a distance between a receiver of the first radio signal and a transmitter of the first radio signal.

In one embodiment, the second transmission timing adjustment is related to a height of a receiver of the first radio signal.

In one embodiment, the second transmission timing adjustment is related to a distance between a receiver of the first radio signal and a transmitter of the first radio signal.

Embodiment 2

Figure 2:
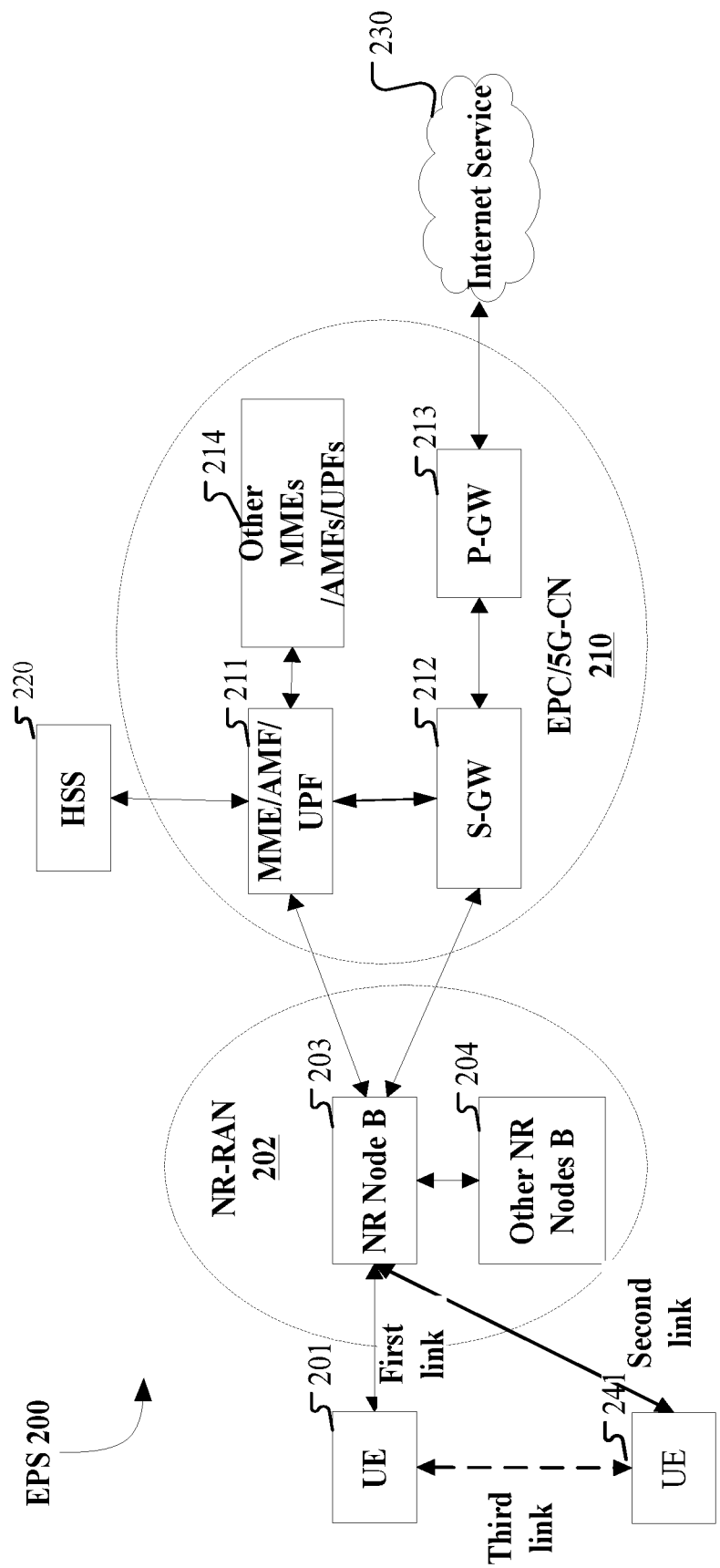
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates the network architecture 200 of NR 5G, Long-Term Evolution (LTE) and Long-Term Evolution Advanced (LTE-A). The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be referred as a base station, a base transceiver station, a radio base station, a radio transceiver, a transceiver function, a Basic Service Set (BSS), an Extended Service Set (ESS), a Transmission and Reception Point (TRP), or some other suitable terms. In an NTN network, gNB 203 may be a satellite or a territorial base station relayed through a satellite. The gNB 203 provides an access point to the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), air vehicles, narrow-band physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first-type communication node in the present disclosure.

In one embodiment, the UE 201 supports transmission in a Non-Terrestrial Network (NTN).

In one embodiment, the gNB 203 corresponds to the second-type communication node in the present disclosure.

In one embodiment, the gNB 203 supports transmission in a Non-Terrestrial Network (NTN).

Embodiment 3

Figure 3:
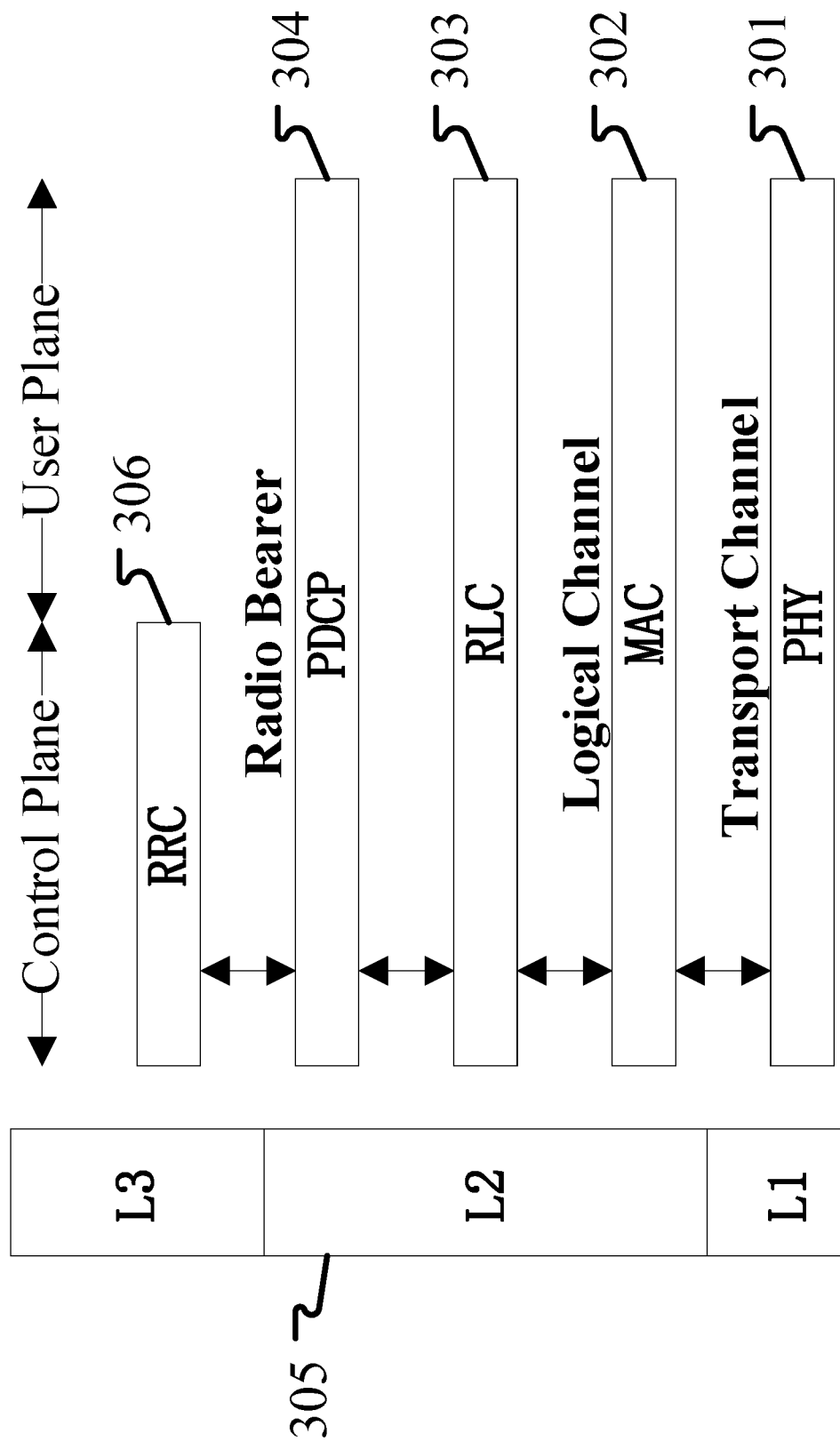
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture for a first-type communication node (UE) and a second-type communication node (gNB, eNB or a satellite in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between a first-type communication node and a second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at a second-type communication node of the network side. Although not described in FIG. 3, a first-type communication node may comprise several higher layers above the L2 305, such as a network layer (e.g., IP layer) terminated at a P-GW of the network side and an application layer terminated at the other side of the connection (e.g., a remote UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for a first-type communication node handover between second-type communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first-type communication nodes various radio resources (e.g., resource block) in a cell. The MAC sublayer 302 is also responsible for HARQ operation. In the control plane, the radio protocol architecture of a first-type communication node and a second-type communication node is almost the same as the radio protocol architecture on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring the lower layer using an RRC signaling between a second-type communication node and a first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information in the present disclosure is generated by the RRC 306.

In one embodiment, the first information in the present disclosure is generated by the MAC 302.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the first radio signal in the present disclosure is generated by the RRC 306.

In one embodiment, the first radio signal in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

In one embodiment, the fourth information in the present disclosure is generated by the RRC 306.

In one embodiment, the fourth information in the present disclosure is generated by the MAC 302.

In one embodiment, the fourth information in the present disclosure is generated by the PHY 301.

In one embodiment, the fifth information in the present disclosure is generated by the RRC 306.

In one embodiment, the fifth information in the present disclosure is generated by the MAC 302.

In one embodiment, the second radio signal in the present disclosure is generated by the RRC 306.

In one embodiment, the second radio signal in the present disclosure is generated by the PHY 301.

Embodiment 4

Figure 4:
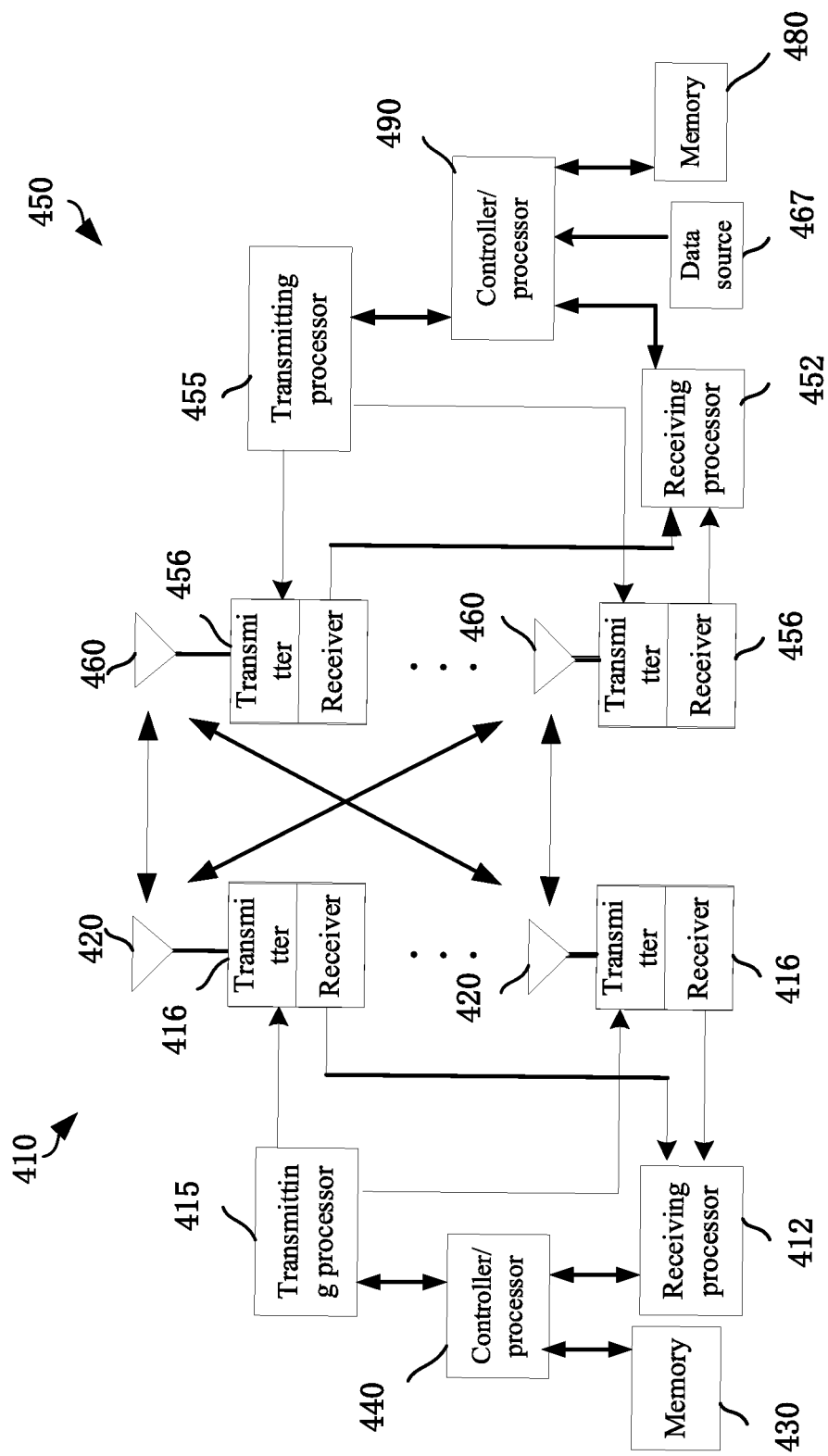
FIG. 4 illustrates a schematic diagram of a first-type communication node and a second-type of communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE 450 comprises a controller/processor 490, a memory 480, a receiving processor 452, a transmitter/receiver 456, a transmitting processor 455 and a data source 467, a transmitter/receiver 456 and an antenna 460. A higher layer packet is provided to the controller/processor 490 by the data source 467, the controller/processor 490 provides header compression, encryption, packet segmentation and reordering, and a multiplexing between a logical channel and a transport channel so as to implement the L2 layer protocols used for the user plane and the control plane; the higher layer packet may comprise data or control information, such as a DL-SCH and a UL-SCH; the transmitting processor 455 performs various signal transmitting processing functions used for the L1 layer (that is, PHY), including coding, interleaving, scrambling, modulation, power control/allocation and generation of physical layer control signaling. The receiving processor 452 performs various signal receiving processing functions used for the L1 layer (that is, PHY), including decoding, deinterleaving, descrambling, demodulation, deprecoding and extraction of physical layer control signaling. The transmitter 456 is used to convert a baseband signal provided by the transmitting processor 455 into a radio-frequency signal and transmit it via the antenna 460, and the receiver 456 is used to convert a radio-frequency signal received via the antenna 460 into a baseband signal and provide it to the receiving processor 452.

The base station (410) comprises a controller/processor 440, a memory 430, a receiving processor 412, a transmitter/receiver 416, a transmitting processor 415, and an antenna 420. A higher layer packet is provided to the controller/processor 440, and the controller/processor 440 provides header compression and decompression, encryption and decoding, packet segmentation and reordering, as well as a multiplexing between a logical channel and a transport channel so as to implement the L2 layer protocols used for the user plane and the control plane. The higher layer packet may comprise data or control information, such as a DL-SCH or a UL-SCH. The transmitting processor 415 performs various signal transmitting processing functions used for the L1 layer (that is, PHY), including coding, interleaving, scrambling, modulation, power control/allocation, precoding and generation of physical layer signalings (including a synchronization signal, a reference signal and etc.). The receiving processor 412 performs various signal receiving and processing functions used for the L1 layer (that is, PHY), including decoding, deinterleaving, descrambling, demodulation, deprecoding and extraction of physical layer signaling. The transmitter 416 is used to convert a baseband signal provided by the transmitting processor 415 into a radio-frequency signal and transmit it via the antenna 420, and the receiver 416 is used to convert a radio-frequency signal received via the antenna 420 into a baseband signal and provide it to the receiving processor 412.

In Downlink (DL) transmission, a higher packet is provided to the controller/processor 440. The controller/processor 440 implements functions of L2 layer. In DL transmission, the controller/processor 440 provides header compression, encryption, packet segmentation and reordering, multiplexing between a logical channel and a transport channel, and radio resources allocation for the UE 450 based on various priorities. The controller/processor 440 is also responsible for HARQ operation, retransmission of a lost packet, and a signaling to the UE 450, such as the generation of first information, second information, third information, fourth information and fifth information in the present disclosure. The transmitting processor 415 implements various signal processing functions on the L1 layer (i.e., physical layer), including coding and interleaving to ensure an FEC (Forward Error Correction) at the UE 450 side, modulating a baseband signal based on various modulation schemes (e.g., Binary Phase Shift Keying (BPSK), Quadrature Phase Shift Keying (QPSK)), dividing modulation symbols into parallel streams and mapping each stream into a corresponding multi-carrier subcarrier and/or a multi-carrier symbol, which are then transmitted in the form of a radio-frequency signal by the transmitting processor 415 mapping to the antenna 420 via the transmitter 416. The first information, the second information, the third information, the fourth information and the fifth information in the present disclosure are mapped to target air interface resources by the transmitting processor 415 in the corresponding channel of the physical layer and then transmitted in the form of a radio-frequency signal by the transmitter 416 mapped to the antenna 420. At the receiving end, each receiver 456 receives a radio-frequency signal via its corresponding antenna 460, recovers baseband information modulated to a radio-frequency carrier, and supplies baseband information to the receiving processor 452. The receiving processor 452 implements various signal receiving and processing functions of the L1 layer. The signal receiving and processing functions include receiving a physical layer signal carrying the first information, the second information, the third information, the fourth information and the fifth information in the present disclosure, demodulating based on various modulation schemes (e.g., BPSK, and QPSK) via a multi-carrier symbol in a multi-carrier symbol stream, then decoding and de-interleaving to recover a data or a control signal transmitted by the gNB 410 in a physical channel, and providing the data and the control signal to the controller/processor 490. The controller/processor 490 implements functions of L2 layer. The controller/processor can be connected to a memory 480 that stores program code and data. The memory 480 can be called a computer readable medium.

In uplink (UL) transmission, a data source 467 is used to provide a first radio signal in the present disclosure to the controller/processor 490. The data source 467 represents all protocol layers above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the gNB 410. The controller/processor 490 is also in charge of HARQ operation, retransmission of a lost packet, and a signaling to the gNB 410. The transmitting processor 455 performs various signal processing functions on the layer L1 (i.e., the physical layer). The signal transmission processing functions include coding and interleaving to facilitate Forward Error Correction (FEC) at the UE 350, modulating a baseband signal based on various modulation schemes, dividing modulation symbols into parallel streams and mapping each stream into a corresponding multi-carrier subcarrier and/or a multi-carrier symbol, which are then transmitted by the transmitting processor 455 in the form of a radio-frequency signal via the transmitter 456 mapping to the antenna 460, and a signal on the physical layer (including a second radio signal in the disclosure) being generated at the transmitting processor 455. The receiver 416 receives a radio-frequency signal via its corresponding antenna 420, and each receiver 416 recovers baseband information modulated to a radio-frequency carrier, and supplies the baseband information to the receiving processor 412. The receiving processor 412 performs various signal receiving and processing functions used for the L1 layer (i.e., physical layer), including obtaining a multi-carrier symbol stream, demodulating multi-carrier symbols in the multi-carrier symbol stream based on various modulation schemes, then decoding and de-interleaving to recover a data and/or a control signal originally transmitted by the UE 450 in a physical channel. The data and/or the control signal are then provided to the controller/processor 440. The controller/processor 440 performs functions of L2 layer. The controller/processor can be connected to a memory 430 that stores program code and data. The memory 430 may be called a computer readable medium.

In one embodiment, the UE 450 corresponds to the first-type communication node in the present disclosure.

In one embodiment, the gNB 410 corresponds to the second-type communication node in the present disclosure.

In one embodiment, the UE 450 comprises at least one processor and at least one memory. The at least one memory comprises computer program codes; the at least one memory and the computer program codes are configured to be used in collaboration with the at least one processor. The UE 450 at least receives first information; receives second information; and transmits a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the UE 450 comprises a memory that stores a computer readable instruction program. The computer readable instruction program generates actions when executed by at least one processor, including: receiving first information; receiving second information; and transmitting a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the eNB 410 comprises: at least one processor and at least one memory, the at least one memory comprises computer program codes; the at least one memory and the computer program codes are configured to be used in collaboration with the at least one processor. The gNB 410 at least: transmits first information; transmits second information; and receives a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the eNB 410 comprises a memory that stores a computer readable instruction program. The computer readable instruction program generates actions when executed by at least one processor, including: transmitting first information; transmitting second information; and receiving a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the third information in the present disclosure.

In one embodiment, the receiver 456 (including the antenna 460), the receiving processor 452 and the controller/processor 490 are used to receive the fourth information in the present disclosure.

In one embodiment, the receiver 456 (including the antenna 460), the receiving processor 452 and the controller/processor 490 are used to receive the fifth information in the present disclosure.

In one embodiment, the transmitter 456 (including the antenna 460), the transmitting processor 455 and the controller/processor 490 are used to transmit the first radio signal in the present disclosure.

In one embodiment, the transmitter 456 (including the antenna 460), and the transmitting processor 455 are used to transmit the second radio signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the third information in the present disclosure.

In one embodiment, the transmitter 416 (including the antenna 420), the transmitting processor 415 and the controller/processor 440 are used to transmit the fourth information in the present disclosure.

In one embodiment, the transmitter 416 (including the antenna 420), the transmitting processor 415 and the controller/processor 440 are used to transmit the fifth information in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420) and the receiving processor 412 are used to receive the second radio signal in the present disclosure.

Embodiment 5

Figure 5:
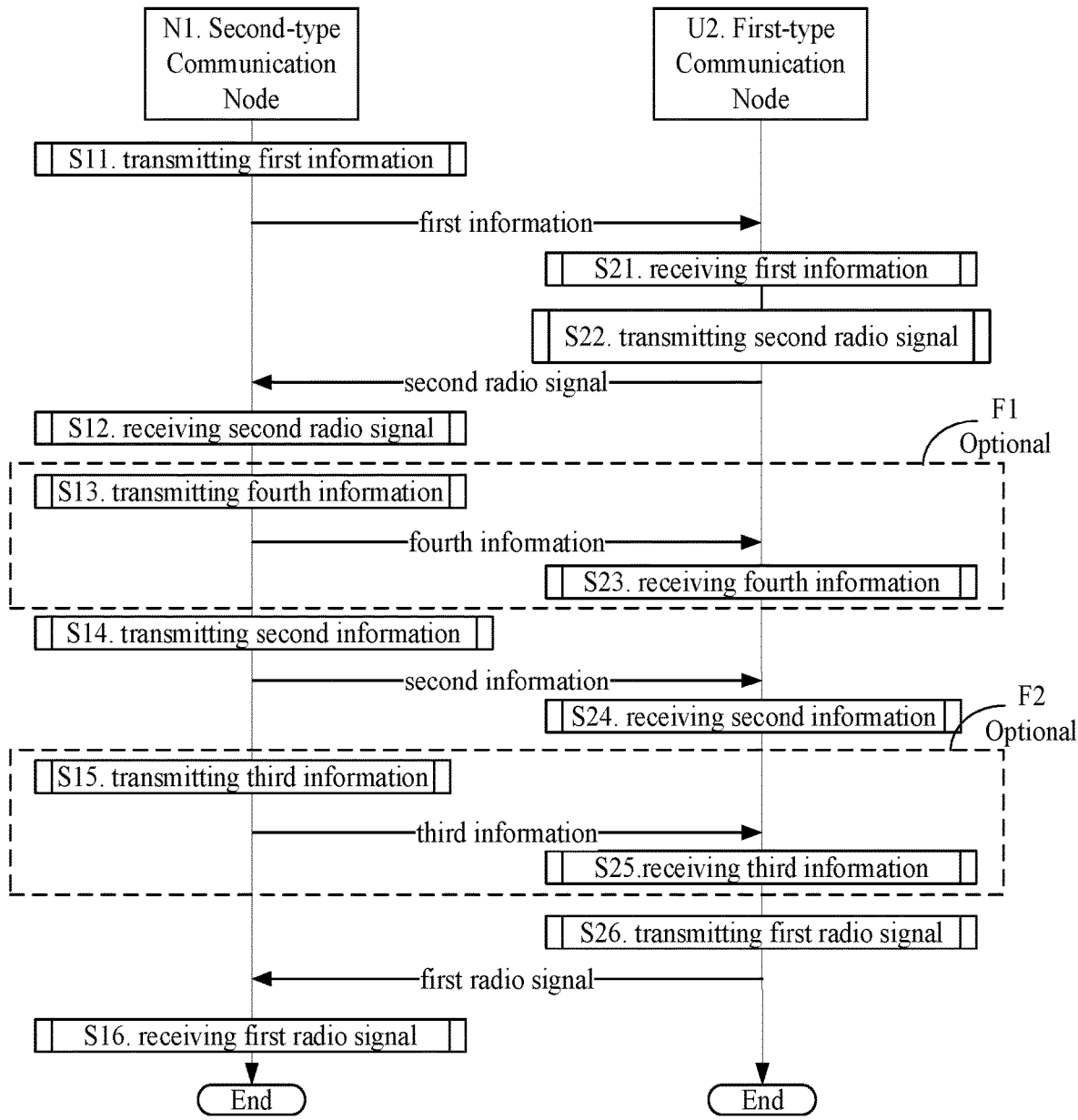
FIG. 5 illustrates a flow chart of radio signal transmission according to one embodiment of the present disclosure.

Embodiment 5 illustrates a radio signal transmission flow chart according to one embodiment in the present disclosure, as shown in FIG. 5. In FIG. 5, a second-type communication node N1 is a maintenance base station of a serving cell of a first-type communication node U2, and steps in the dotted box are optional.

The second-type communication node N1 transmits first information in step S11, receives a second radio signal in step S112, transmits fourth information in step S13, transmits second information in step S14, transmits third information in step S15, and receives a first radio signal in step S16.

The first-type communication node U2 receives first information in step S21, transmits a second radio signal in step S22, receives fourth information in step S23, receives second information in step S24, receives third information in step S25, and transmits a first radio signal in step S26.

In Embodiment 5, the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface; the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment; the Q2 consecutive non-negative integers belong to a first integer set, and the fourth information is used to determine the first integer set in X integer sets, the X being a positive integer greater than 1; each of the X integer sets comprises a positive integer number of non-negative integer(s), the X integer sets being predefined, and the fourth information is transmitted through the air interface; the second radio signal is used to determine at least one of a start time for a transmission of the first information or a start time for a transmission of the second information, and the second radio signal is transmitted through the air interface.

In one embodiment, at least the latter of the minimum step-size corresponding to the first transmission timing adjustment and the minimum step-size corresponding to the second transmission timing adjustment is related to a sub-carrier spacing of sub-carriers occupied by the first radio signal.

In one embodiment, the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers all being non-negative values.

In one embodiment, the second information and the third information are transmitted through a same physical channel.

In one embodiment, the second information and the third information are transmitted through different physical channels.

In one embodiment, the second information and the third information both carry part of information of a RAR.

In one embodiment, the third information comprises an UL Grant of a RAR.

In one embodiment, the third information comprises one or more Fields of Downlink Control Information (DCI).

In one embodiment, the third information is transmitted through a Physical Downlink Control Channel (PDCCH).

In one embodiment, the third information indicates the second time.

In one embodiment, the third information is used by the first-type communication node to determine the second time.

In one embodiment, the fourth information and the third information are transmitted through a same physical channel.

In one embodiment, the fourth information and the third information are transmitted through different physical channels.

In one embodiment, the fourth information is used by the first-type communication node to determine the first integer set among X integer sets.

In one embodiment, the fourth information indicates the first integer set among X integer sets.

In one embodiment, the fourth information is used to determine whether the first integer set corresponds to an SCG.

In one embodiment, the fourth information comprises all or part of information of a higher-layer signaling.

In one embodiment, the fourth information comprises all or part of information of an RRC signaling.

In one embodiment, the fourth information comprises all or part of information of a MAC signaling.

In one embodiment, the fourth information is transmitted through a PDSCH.

In one embodiment, the fourth information is transmitted through a PDCCH.

In one embodiment, the fourth information comprises all or part of information of a physical-layer signaling.

In one embodiment, the fourth information comprises all or part of information of a DCI signaling.

Embodiment 6

Figure 6:
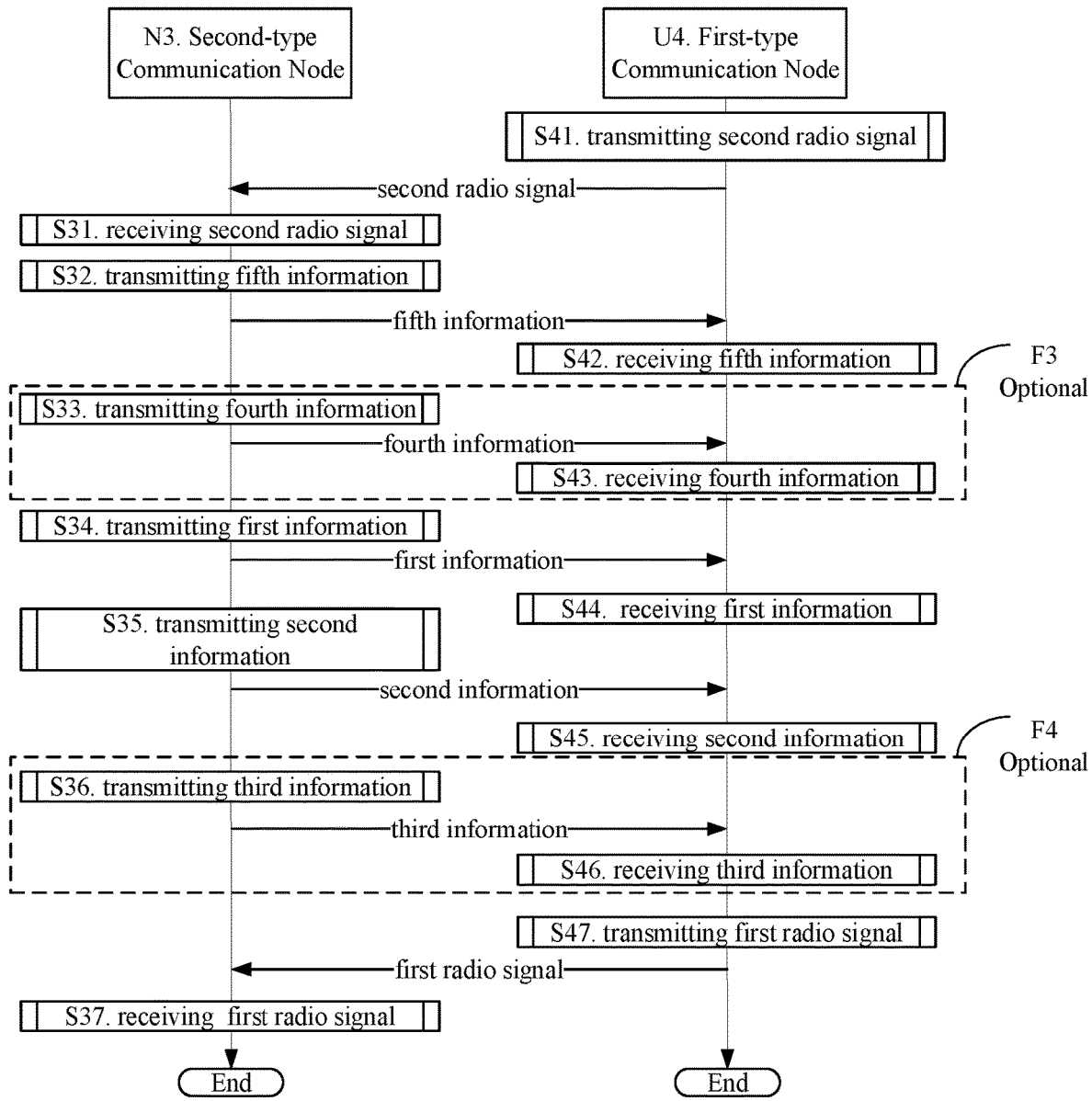
FIG. 6 illustrates a flow chart of radio signal transmission according to another embodiment of the present disclosure.

Embodiment 6 illustrates a radio signal transmission flow chart according to another embodiment in the present disclosure, as shown in FIG. 6. In FIG. 6, a second-type communication node N3 is a maintenance base station of a serving cell of a first-type communication node U4, and steps in the dotted box are optional.

The second-type communication node N3 receives a second radio signal in step S31, transmits fifth information in step S32, transmits fourth information in step S33, transmits first information in step S34, transmits second information in step S35, transmits third information in step S36, and receives a first radio signal in step S37.

The first-type communication node U4 transmits a second radio signal in step S41, receives fifth information in step S42, receives fourth information in step S43, receives first information in step S44, receives second information in step S45, receives third information in step S46, and transmits a first radio signal in step S47.

In Embodiment 6, the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the start time for the transmission of the first radio signal is a first time, and an expected start time for a reception of the first radio signal is a second time; a sum of the first transmission timing adjustment and the second transmission timing adjustment is used to determine a length of a time interval between the first time and the second time; the third information is used to determine the second time, and the third information is transmitted through the air interface; the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment; the Q2 consecutive non-negative integers belong to a first integer set, and the fourth information is used to determine the first integer set in X integer sets, the X being a positive integer greater than 1; each of the X integer sets comprises a positive integer number of non-negative integer(s), the X integer sets being predefined, and the fourth information is transmitted through the air interface; the fifth information is used to determine whether the minimum step-size corresponding to the first transmission timing adjustment is equal to the minimum step-size corresponding to the second transmission timing adjustment, and the fifth information is transmitted through the air interface; the second radio signal is used to determine at least one of a start time for a transmission of the first information or a start time for a transmission of the second information, and the second radio signal is transmitted through the air interface.

In one embodiment, at least the latter of the minimum step-size corresponding to the first transmission timing adjustment and the minimum step-size corresponding to the second transmission timing adjustment is related to a sub-carrier spacing of sub-carriers occupied by the first radio signal.

In one embodiment, the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers all being non-negative values.

In one embodiment, the second information and the third information are transmitted through a same physical channel.

In one embodiment, the second information and the third information are transmitted through different physical channels.

In one embodiment, the second information and the third information both carry part of information of a RAR.

In one embodiment, the third information comprises an UL Grant of a RAR.

In one embodiment, the third information comprises one or more Fields of Downlink Control Information (DCI).

In one embodiment, the third information is transmitted through a Physical Downlink Control Channel (PDCCH).

In one embodiment, the third information indicates the second time.

In one embodiment, the third information is used by the first-type communication node to determine the second time.

In one embodiment, the fourth information comprises all or part of information of a higher-layer signaling.

In one embodiment, the fourth information comprises all or part of information of an RRC signaling.

In one embodiment, the fourth information comprises all or part of information of a MAC signaling.

In one embodiment, the fourth information is transmitted through a PDSCH.

In one embodiment, the fourth information is transmitted through a PDCCH.

In one embodiment, the fourth information comprises all or part of information of a physical-layer signaling.

In one embodiment, the fourth information comprises all or part of information of a DCI signaling.

In one embodiment, the fourth information and the third information are transmitted through a same physical channel.

In one embodiment, the fourth information and the third information are transmitted through different physical channels.

In one embodiment, the fourth information is used by the first-type communication node to determine the first integer set among X integer sets.

In one embodiment, the fourth information indicates the first integer set among X integer sets.

In one embodiment, the fourth information is used to determine whether the first integer set corresponds to an SCG.

In one embodiment, the fifth information indicates that the minimum step-size corresponding to the first transmission timing adjustment is equal to the minimum step-size corresponding to the second transmission timing adjustment.

In one embodiment, the fifth information is used to determine the minimum step-size corresponding to the first transmission timing adjustment among Y unequal candidate step-sizes, the Y being a positive integer greater than 1.

In one embodiment, the fifth information is used to determine the minimum step-size corresponding to the first transmission timing adjustment among Y unequal candidate step-sizes, the Y being a positive integer greater than 1, and the minimum step-size corresponding to the second transmission timing adjustment is equal to one of the Y unequal candidate step-sizes.

In one embodiment, the fifth information indicates that whether a receiver of the first radio signal is a terrestrial base station or a satellite base station.

In one embodiment, the fifth information indicates that whether a receiver of the first radio signal is a terrestrial base station or a satellite.

In one embodiment, the fifth information indicates that whether the minimum step-size corresponding to the first transmission timing adjustment is applied to satellite communication.

In one embodiment, the fifth information indicates that whether the minimum step-size corresponding to the first transmission timing adjustment is equal to a step-size newly introduced in the current version or equal to an existing step-size in a previous version.

In one embodiment, the fifth information is transmitted through a Physical Broadcast Channel (PBCH).

In one embodiment, the fifth information comprises one or more Fields of a Master Information Block (MIB).

In one embodiment, the fifth information is transmitted through a Downlink Shared Channel (DL-SCH).

In one embodiment, the fifth information is transmitted through a Physical Downlink Shared Channel (PDSCH).

In one embodiment, the fifth information comprises one or more Fields of a System Information Block (SIB).

In one embodiment, the fifth information comprises one or more Fields of Remaining System Information (RMSI).

In one embodiment, the fifth information comprises all or part of a Radio Resource Control (RRC).

In one embodiment, the fifth information comprises all or part of a Random Access Response (RAR).

In one embodiment, the fifth information comprises all or part of Msg-2 (Message-2 in random access process).

In one embodiment, the fifth information and the first information are transmitted through a same physical channel.

In one embodiment, the fifth information and the first information are transmitted through different physical channels.

Embodiment 7

Figure 7:
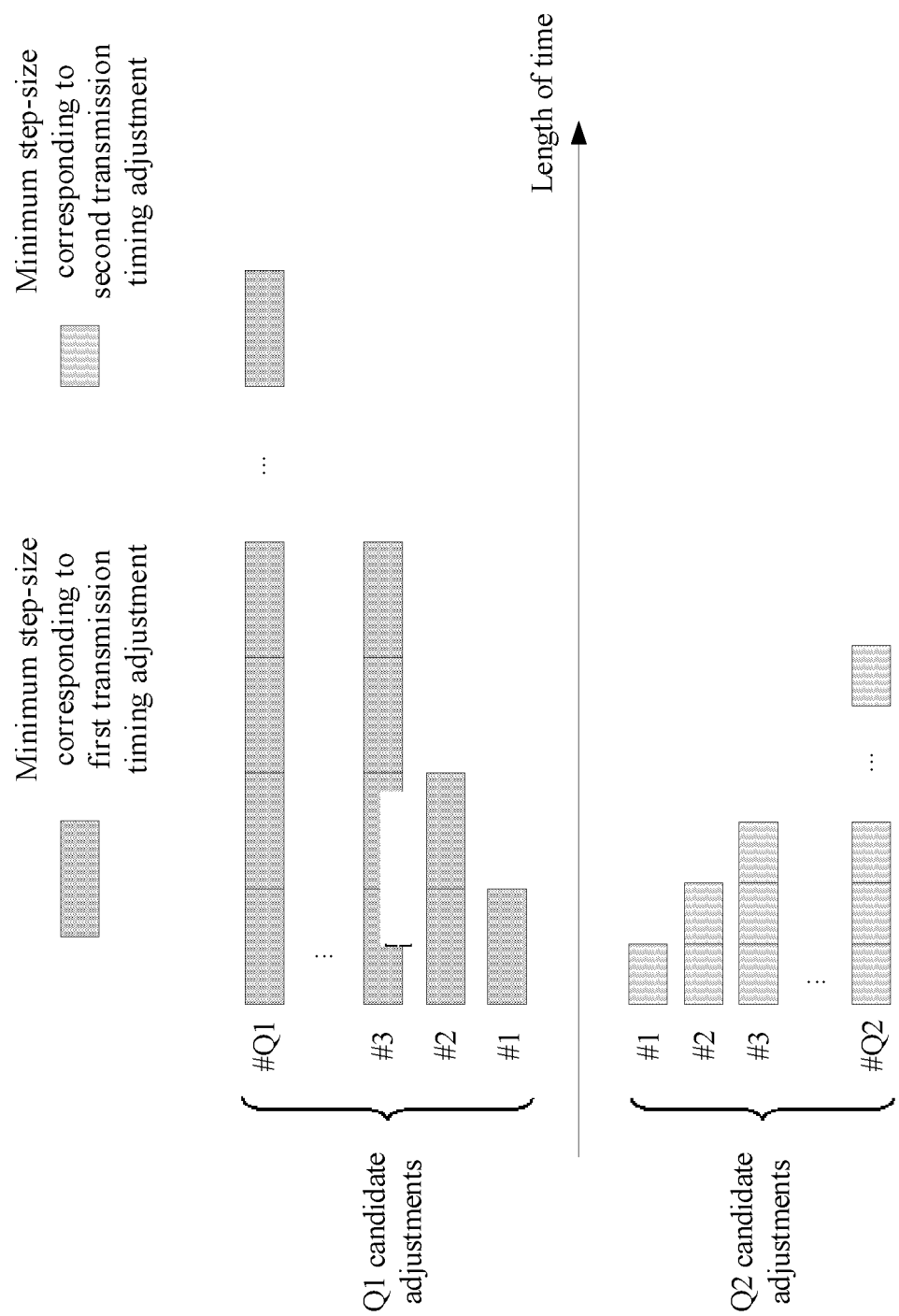
FIG. 7 illustrates a schematic diagram of the relationship between Q1 candidate adjustments and Q2 candidate adjustments according to one embodiment of the present disclosure.

Embodiment 7 illustrates a schematic diagram of a relationship between Q1 candidate adjustments and Q2 candidate adjustments according to one embodiment of the present disclosure, as shown in FIG. 7. In FIG. 7, the horizontal axis represents time length, the smallest rectangle filled with cross lines represents a minimum step-size corresponding to a first transmission timing adjustment, and the smallest rectangle filled with slashes represents a minimum step-size corresponding to a second transmission timing adjustment.

In Embodiment 7, the first transmission timing adjustment in the present disclosure is one of Q1 candidate adjustments, and the second transmission timing adjustment in the present disclosure is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1;

In one embodiment, any two of the Q1 candidate adjustments are unequal.

In one embodiment, units of measurement of any two of the Q1 candidate adjustments are the same.

In one embodiment, any two of the Q2 candidate adjustments are unequal.

In one embodiment, units of measurement of any two of the Q2 candidate adjustments are the same.

In one embodiment, the Q1 candidate adjustments are arranged in order of size, and an absolute value of a difference of any two adjacent candidate adjustments of the Q1 candidate adjustments is equal to the minimum step-size corresponding to the first transmission timing adjustment.

In one embodiment, the Q1 candidate adjustments are arranged in order of size, and there is an absolute value of a difference of two adjacent candidate adjustments of the Q1 candidate adjustments being greater than the minimum step-size corresponding to the first transmission timing adjustment.

In one embodiment, the Q2 candidate adjustments are arranged in order of size, and an absolute value of a difference of any two adjacent candidate adjustments of the Q2 candidate adjustments is equal to the minimum step-size corresponding to the second transmission timing adjustment.

In one embodiment, the Q2 candidate adjustments are arranged in order of size, and there is an absolute value of a difference of two adjacent candidate adjustments of the Q2 candidate adjustments being greater than the minimum step-size corresponding to the second transmission timing adjustment.

In one embodiment, the Q1 candidate adjustments respectively correspond to heights of Q1 satellites.

In one embodiment, the Q1 candidate adjustments respectively correspond to delays from Q1 satellites to the ground plus a delay in a Feeder Link.

In one embodiment, there is one of the Q1 candidate adjustments being equal to 0.

In one embodiment, any of the Q1 candidate adjustments is a non-negative real number.

In one embodiment, there is one of the Q2 candidate adjustments being equal to 0.

In one embodiment, any of the Q2 candidate adjustments is a non-zero real number.

A start time for a transmission of the first radio signal in the present disclosure is related to the first transmission timing adjustment in the present disclosure and the second transmission timing adjustment in the present disclosure; a minimum step-size corresponding to the first transmission timing adjustment is not equal to a minimum step-size corresponding to the second transmission timing adjustment; the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

The first bit block in the present disclosure is used to generate X1 modulation symbols, and the X1 modulation symbols correspond to X1 resource elements respectively; the first radio signal in the present disclosure occupies X2 resource elements among the X1 resource elements; the first radio signal is generated by X2 modulation symbols among the X1 modulation symbols corresponding to the X2 resource elements, the X2 being a positive integer and the X1 being a positive integer greater than the X2.

In one embodiment, there are also X3 resource elements among the X1 resource elements (RE) occupied by a fourth radio signal among the K1 radio signals, and there is no resource element belonging to the X2 resource elements and the X3 resource elements at the same time.

In one embodiment, the first radio signal is punctured by one or more radio signals other than the first radio signal among the K1 radio signals.

In one embodiment, the first radio signal is pre-empted by one or more radio signals other than the first radio signal among the K1 radio signals.

In one embodiment, the X1 modulation symbols all adopt a same modulation scheme.

In one embodiment, the first radio signal is used to transmit a complete Transport Block (TB).

In one embodiment, the first radio signal is used to transmit all Coding Blocks in a TB.

In one embodiment, each of the X1 resource elements (RE) occupies a sub-carrier in frequency domain and a multi-carrier symbol in time domain, wherein the multi-carrier symbol comprises a Cyclic Prefix (CP).

In one embodiment, each of the X1 resource elements (RE) occupies an Orthogonal Frequency Division Multiplexing (OFDM) sub-carrier in frequency domain and an OFDM symbol in time domain, wherein the OFDM symbol comprises a Cyclic Prefix (CP).

In one embodiment, the X1 modulation symbols are generated by bits in the first bit block successively through Modulation.

In one embodiment, the X1 modulation symbols are generated by bits in the first bit block successively through Scrambling and Modulation.

In one embodiment, the X1 modulation symbols are generated by the first bit block successively through Segmentation, Channel Coding, Rate Matching, Concatenation, Scrambling and Modulation.

In one embodiment, the X1 modulation symbols are generated by the first bit block successively through Channel Coding, Rate Matching, Scrambling and Modulation.

Embodiment 8

Figure 8:
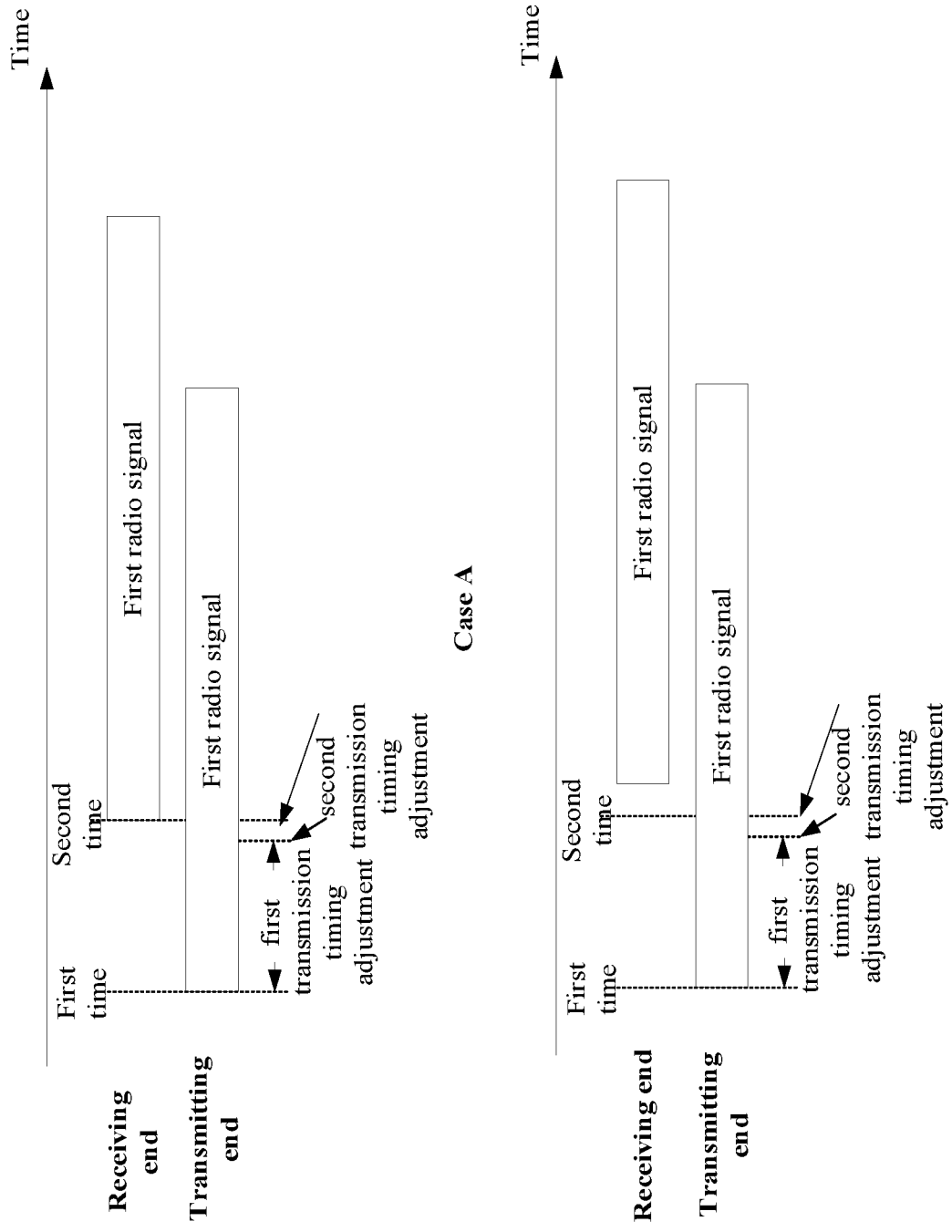
FIG. 8 illustrates a schematic diagram of the relationship between a first time and a second time according to one embodiment of the present disclosure.

Embodiment 8 illustrates a schematic diagram of a first time and a second time according to one embodiment of the present disclosure, as shown in FIG. 8. In FIG. 8, the horizontal axis represents time. In case A, the second time is a start time for a reception of a first radio signal, while in case B, the second time is different from a start time for a reception of a first radio signal.

In Embodiment 8, a start time for a transmission of the first radio signal in the present disclosure is a first time, and an expected start time for a reception of the first radio signal is a second time; a sum of the first transmission timing adjustment in the present disclosure and the second transmission timing adjustment in the present disclosure is used to determine a length of a time interval from the first time to the second time.

In one embodiment, the second time is different from an actual start time for a reception of the first radio signal.

In one embodiment, the second time is the same with an actual start time for a reception of the first radio signal.

In one embodiment, the second time is a start time for a reception of the first radio signal assumed by the first-type communication node.

In one embodiment, the second time is a start time for a reception of the first radio signal assumed by a transmitter of the first radio signal.

In one embodiment, the first time is earlier than the second time.

In one embodiment, the first time is not later than the second time.

In one embodiment, a length of the time interval from the first time to the second time is a TA value of the first radio signal.

In one embodiment, a sum of the first transmission timing adjustment and the second transmission timing adjustment is a sum of the first transmission timing adjustment and the second transmission timing adjustment being converted into a same unit of measurement.

In one embodiment, a sum of the first transmission timing adjustment and the second transmission timing adjustment is used by the first-type communication node to determine a length of a time interval from the first time to the second time.

In one embodiment, a sum of the first transmission timing adjustment and the second transmission timing adjustment is equal to a length of a time interval from the first time to the second time.

Embodiment 9

Embodiment 9 illustrates a schematic diagram of the relations among the minimum step-size corresponding to a first transmission timing adjustment, the minimum step-size corresponding to a second transmission timing adjustment and a subcarrier spacing of sub-carriers occupied by a first radio signal according to one embodiment of the present disclosure, as shown in FIG. 9. In FIG. 9, the first column represents subcarrier spacings of subcarriers occupied by a radio signal; the second column represents minimum step-sizes of a first stage, and the third column represents minimum step-sizes of the second stage; the subcarrier spacing in bold font is a subcarrier spacing of subcarriers occupied by a first radio signal; the minimum step-size of the first stage in bold font is a minimum step-size corresponding to a first transmission timing adjustment, and the minimum step-size of the second stage in bold font is a minimum step-size corresponding to a second transmission timing adjustment, wherein the TS is equal to $1/(64 \times 30.72 \times 10^6)$ second.

In Embodiment 9, at least the latter of the minimum step-size corresponding to the first transmission timing adjustment and the minimum step-size corresponding to the second transmission timing adjustment is related to a subcarrier spacing of sub-carriers occupied by the first radio signal.

In one embodiment, the third information is used to determine a Subcarrier Spacing (SCS) of subcarriers occupied by the first radio signal.

In one embodiment, the third information indicates a Subcarrier Spacing (SCS) of subcarriers occupied by the first radio signal.

In one embodiment, a subcarrier spacing of subcarriers occupied by the first radio signal is equal to 15 kHz multiplied by a non-negative integer power of 2.

In one embodiment, the minimum step-size corresponding to the first transmission timing adjustment is proportional to a subcarrier spacing of subcarriers occupied by the first radio signal.

In one embodiment, the minimum step-size corresponding to the second transmission timing adjustment is inversely proportional to a subcarrier spacing of subcarriers occupied by the first radio signal.

In one embodiment, the minimum step-size corresponding to the second transmission timing adjustment is inversely proportional to a subcarrier spacing of subcarriers occupied by the first radio signal.

In one embodiment, the minimum step-size $\delta_2$ corresponding to the second transmission timing adjustment is obtained by the following formula:

$$\delta_2 = \frac{15}{SC} \times 16 \times 64 \ Ts$$

wherein the SC is a subcarrier spacing of subcarriers occupied by the first radio signal, the Ts is equal to $1/(64 \times 30.72 \times 10^6)$ second.

Embodiment 10

Embodiment 10 illustrates a schematic diagram of obtaining Q2 candidate adjustments according to one embodiment of the present disclosure; as shown in FIG. 10. In FIG. 10, the first column represents Q2 consecutive non-negative integers, the second column represents Q2 candidate integers, and the third column represents Q2 candidate adjustment; 62 is a minimum step-size corresponding to a second transmission timing adjustment; a first threshold is set to be equal to 4 in this embodiment, and Q2 is set to be equal to 8 in this embodiment.

In Embodiment 10, the Q2 candidate adjustments in the present disclosure are obtained by multiplying Q2 candidate integers respectively by the minimum step-size corresponding to the second transmission timing adjustment in the present disclosure, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment.

In one embodiment, the Q2 consecutive non-negative integers are predefined.

In one embodiment, the Q2 consecutive non-negative integers are configurable.

In one embodiment, the Q2 consecutive non-negative integers are 0, 1, 2, . . . , Q2−1.

In one embodiment, the first threshold value is equal to 0.

In one embodiment, the first threshold value is equal to 16.

In a subembodiment, the first threshold is proportional to the Q2.

In one embodiment, the first threshold is equal to ⌈Q2/2⌉.

In one embodiment, the first threshold is proportional to the first transmission timing adjustment.

Embodiment 11

Figure 11:
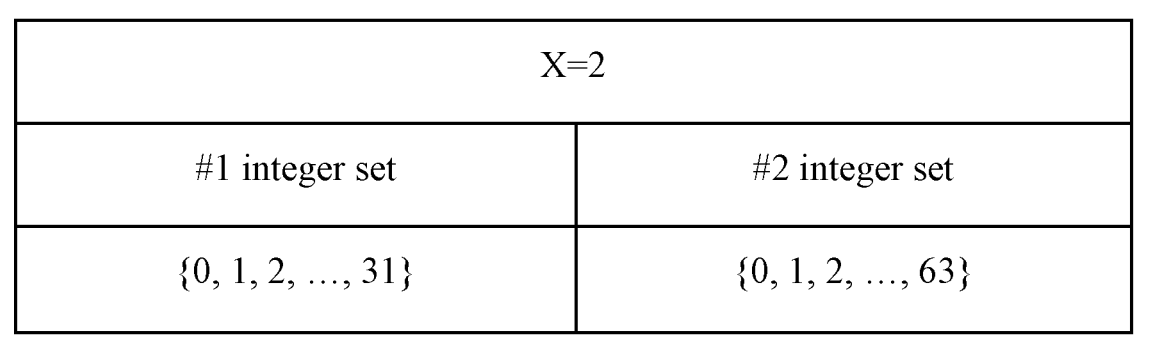

Embodiment 11 illustrates a schematic diagram of X integer sets according to one embodiment of the present disclosure; as shown in FIG. 11. In FIG. 11, X is set to be equal to 2 in this embodiment.

In Embodiment 11, the Q2 consecutive non-negative integers in the present disclosure belong to a first integer set, and the fourth information in the present disclosure is used to determine the first integer set among X integer sets, the X being a positive integer greater than 1; each of the X integer sets comprises a positive integer number of non-negative integer(s), the X integer sets being predefined.

In one embodiment, the X is equal to 2.

In one embodiment, the X is a positive integer greater than 2.

In one embodiment, the X integer sets respectively correspond to X Cell Groups (CG).

In one embodiment, the first integer set corresponds to a Secondary Cell Group (SCG).

In one embodiment, the first integer set corresponds to a CG other than an SCG.

In one embodiment, frequency-domain resources occupied by the first radio signal belong to a Carrier comprised in an SCG.

In one embodiment, frequency-domain resources occupied by the first radio signal belong to a Carrier comprised in a CG other than an SCG.

Embodiment 12

Embodiment 12 illustrates a schematic diagram of the relationship between Q1 candidate adjustments and Q1 candidate integers according to one embodiment of the present disclosure; as shown in FIG. 12. In FIG. 12, the first column represents Q1 candidate integers, the second column represents Q1 candidate adjustments, and $\delta_1$ is a minimum step-size corresponding to a first transmission timing adjustment, the Q1 being set to be equal to 4 in this embodiment.

In Embodiment 12, the Q1 candidate adjustments in the present disclosure are predefined; or the Q1 candidate adjustments in the present disclosure are obtained by multiplying the Q1 candidate integers respectively by the minimum step-size corresponding to the first transmission timing adjustment in the present disclosure; the first information in the present disclosure indicates a candidate integer generating the first transmission timing adjustment in the Q1 candidate integers, the Q1 candidate integers all being non-negative values.

In one embodiment, the Q1 candidate integers are predefined;

In one embodiment, the Q1 candidate adjustments are predefined according to a height of the second-type communication node.

In one embodiment, the Q1 candidate adjustments are predefined according to heights of different types of satellites.

In one embodiment, the Q1 candidate adjustments are predefined according to delays from different types of satellites to the ground plus a delay from the satellite to a Feeder Link.

In one embodiment, the Q1 candidate integers are consecutive Q1 integers.

In one embodiment, the Q1 candidate integers comprise 0.

In one embodiment, the Q1 candidate integers do not comprise 0.

In one embodiment, the Q1 candidate integers are consecutive Q1 integers starting with a positive integer A as a minimum value.

In one embodiment, the Q1 candidate integers are discrete.

Embodiment 13

Figure 13:
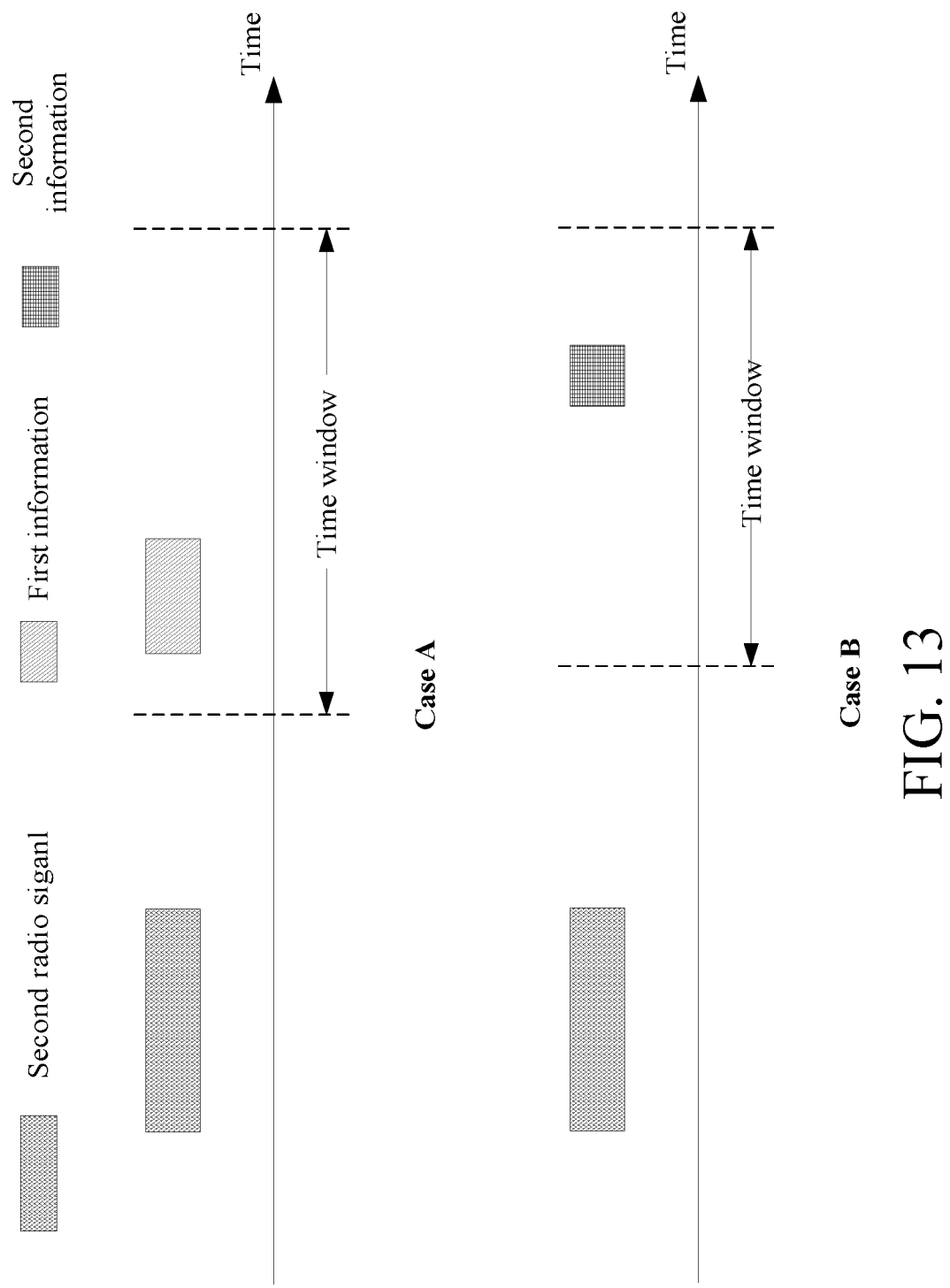
FIG. 13 illustrates a schematic diagram of the relations among a start time for a transmission of first information, a start time for a transmission of second information and a second radio signal according to one embodiment of the present disclosure.

Embodiment 13 illustrates a schematic diagram of the relations among a start time for a transmission of first information, a start time for a transmission of second information and a second radio signal according to one embodiment of the present disclosure, as shown in FIG. 13. In FIG. 13, the horizontal axis represents time, the rectangle filled with cross lines represents a second radio signal, the rectangle filled with slashes represents first information, and the rectangle filled with cross lines represents second information.

In Embodiment 13, the second radio signal in the present disclosure is used to determine at least one of a start time for a transmission of the first information in the present disclosure, or a start time for a transmission of the second information in the present disclosure.

In one embodiment, the second radio signal is transmitted through a PRACH.

In one embodiment, the second radio signal carries a Preamble.

In one embodiment, the second radio signal is transmitted through a Random Access Channel (RACH).

In one embodiment, the first information is transmitted through a RAR, and the second radio signal is used to determine a start time for a transmission of the first information.

In one embodiment, the second information is transmitted through a RAR, and the second radio signal is used to determine a start time for a transmission of the second information.

In one embodiment, the second radio signal is used to determine a first time window, at least one of a start time for a transmission of the first information, or a start time for a transmission of the second information belongs to the first time window.

In one embodiment, the second radio signal is used to determine a first time window, at least one of a start time for a transmission of the first information, or a start time for a transmission of the second information belongs to the first time window; a length of a time interval from a start time of the first time window to a start time for a transmission of the second radio signal is predefined.

In one embodiment, the second radio signal is used to determine a first time window, at least one of a start time for a transmission of the first information, or a start time for a transmission of the second information belongs to the first time window; a length of a time interval from a start time of the first time window to an end time for a transmission of the second radio signal is predefined.

In one embodiment, an end time for a transmission of the second radio signal is earlier than a start time for a reception of the first information.

In one embodiment, a start time for a transmission of the second radio signal is later than an end time for a reception of the first information.

In one embodiment, a start time for a transmission of the second radio signal is used to determine at least one of a start time for a transmission of the first information in the present disclosure, or a start time for a transmission of the second information in the present disclosure.

In one embodiment, an end time for a transmission of the second radio signal is used to determine at least one of a start time for a transmission of the first information in the present disclosure, or a start time for a transmission of the second information in the present disclosure.

Embodiment 14

Figure 14:
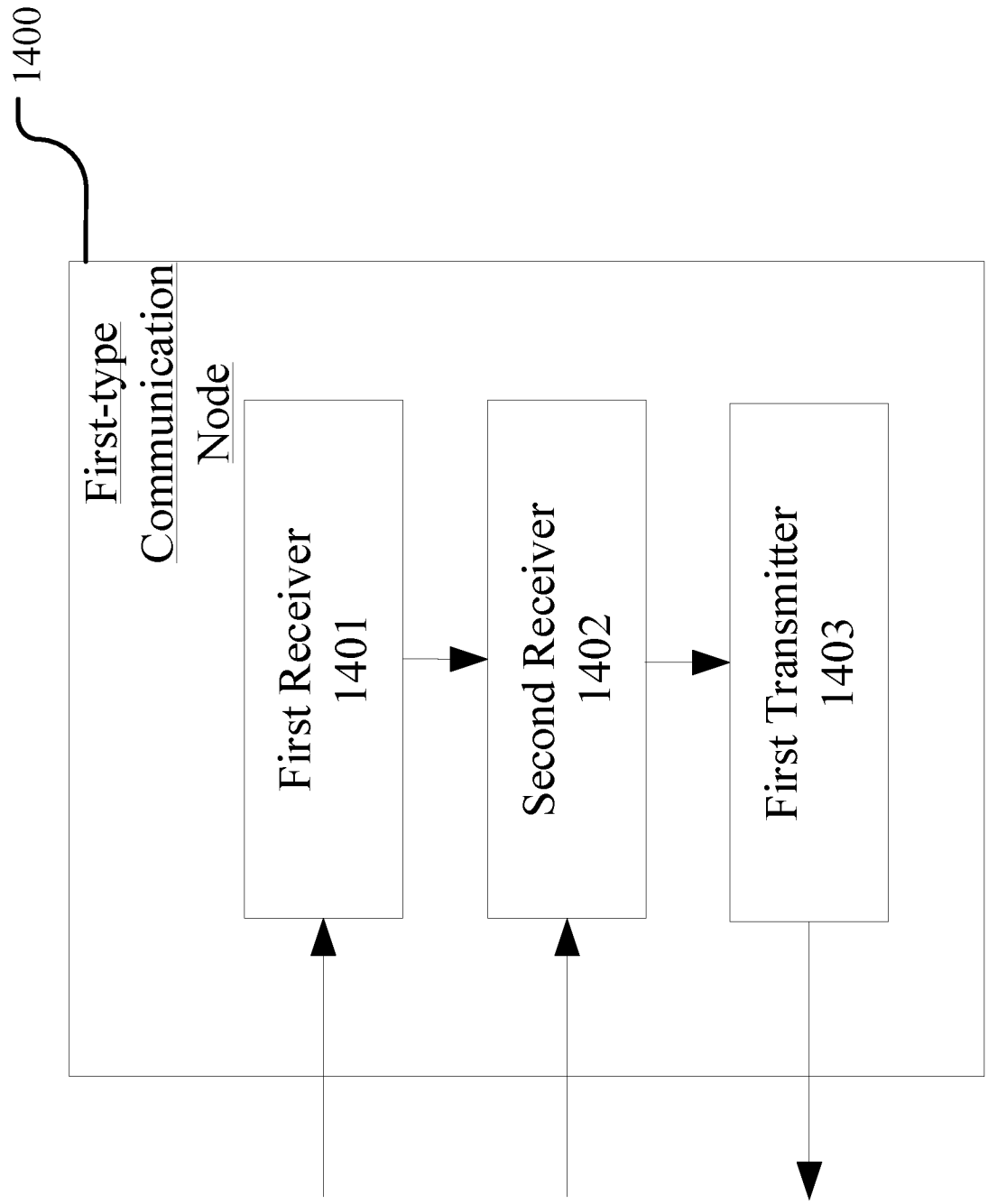
FIG. 14 illustrates a structure block diagram of a processing device in a first-type communication node according to one embodiment of the present disclosure.

Embodiment 14 illustrates a structure diagram of a processing device in a first-type communication node, as shown in FIG. 14. In FIG. 14, a first-type communication node processing device 1400 is mainly composed of a first receiver 1401, a second receiver 1402 and a first transmitter 1403. The first receiver 1401 comprises the transmitter/receiver 456 (including the antenna 460), the receiving processor 452 and the controller/processor 490 in FIG. 4 of the present disclosure; the second receiver 1402 comprises the transmitter/receiver 456 (including the antenna 460), the receiving processor 452 and the controller/processor 490 in FIG. 4 of the present disclosure; the first transmitter 1403 comprises the transmitter/receiver 456 (including the antenna 460), the transmitting processor 455 and the controller/processor 490 in FIG. 4 of the present disclosure.

In Embodiment 14, the first receiver 1401 receives first information; the second receiver 1402 receives second information; the first transmitter 1403 transmits a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

In one embodiment, the second receiver 1402 also receives third information; wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface.

In one embodiment, at least the latter of the minimum step-size corresponding to the first transmission timing adjustment and the minimum step-size corresponding to the second transmission timing adjustment is related to a sub-carrier spacing of sub-carriers occupied by the first radio signal.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment;

In one embodiment, the second receiver 1402 also receives fourth information; wherein the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers respectively; the second information is used in the Q2 consecutive non-negative integers to indicate consecutive non-negative integers that obtain the second transmission timing adjustment, and the first threshold is related to at least one of the Q2 or the first transmission timing adjustment; the Q2 consecutive non-negative integers belong to a first integer set, and the fourth information is used to determine the first integer set in X integer sets, the X being a positive integer greater than 1; each of the X integer sets comprises a positive integer number of non-negative integer(s), the X integer sets being predefined, and the fourth information is transmitted through the air interface.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q1 candidate adjustments are predefined; or the Q1 candidate adjustments are obtained by respectively multiplying the Q1 candidate integers by the minimum step-size corresponding to the first transmission timing adjustment; the first information indicates a candidate integer generating the first transmission timing adjustment in the Q1 candidate integers, the Q1 candidate integers being all non-negative values.

In one embodiment, the first receiver 1401 also receives fifth information; wherein the fifth information is used to determine whether the minimum step-size corresponding to the first transmission timing adjustment is equal to the minimum step-size corresponding to the second transmission timing adjustment, and the fifth information is transmitted through the air interface.

In one embodiment, the first transmitter 1403 also transmits a second radio signal; wherein the second radio signal is used to determine at least one of a start time for a transmission of the first information or a start time for a transmission of the second information, and the second radio signal is transmitted through the air interface.

Embodiment 15

Figure 15:
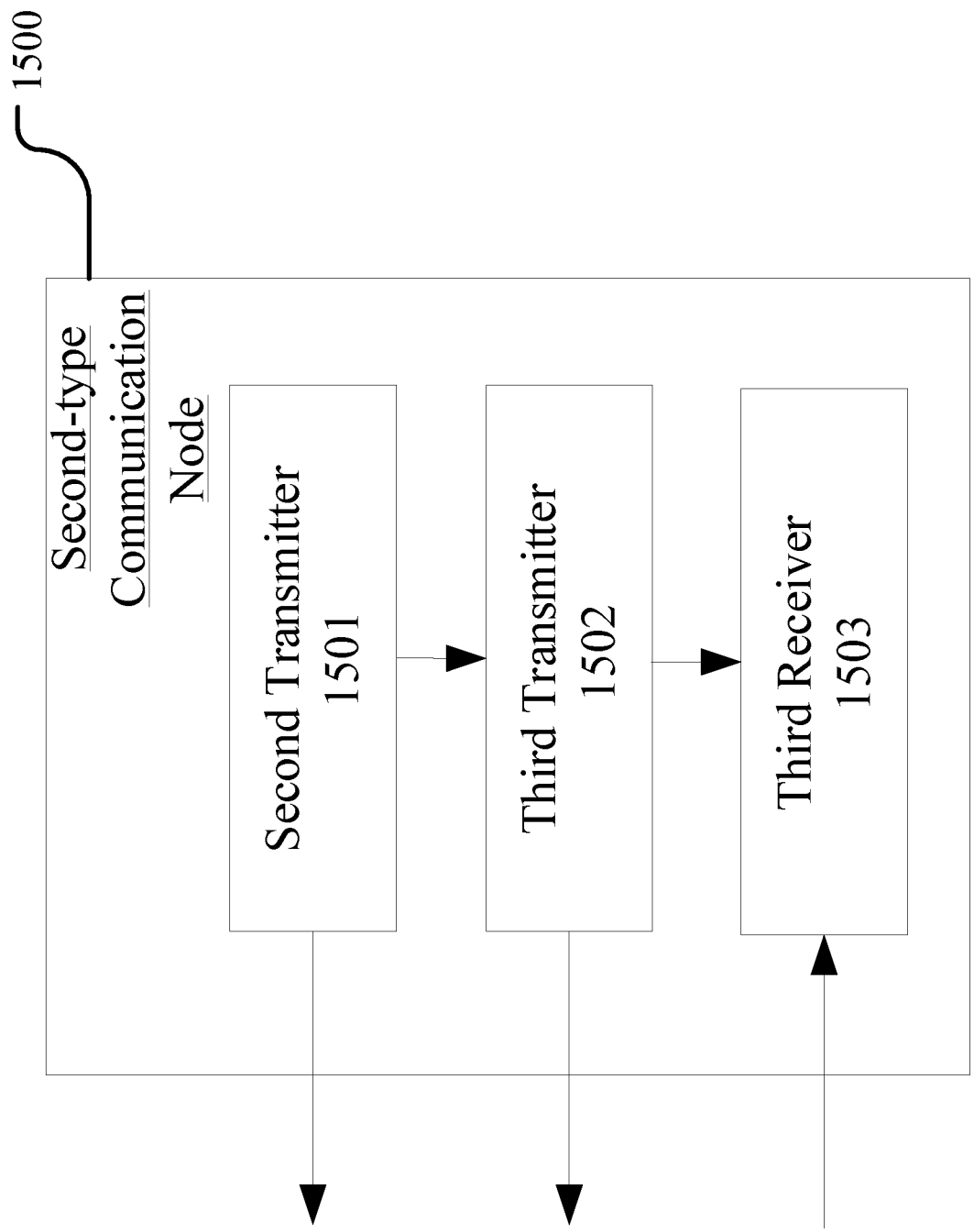
FIG. 15 illustrates a structure block diagram of a processing device in a second-type communication node according to one embodiment of the present disclosure.

Embodiment 15 illustrates a structure diagram of a processing device in a second-type communication node, as shown in FIG. 15. In FIG. 15, a second-type communication node processing device 1500 is mainly composed of a second transmitter 1501, a third transmitter 1502 and a third receiver 1503. The second transmitter 1501 comprises the transmitter/receiver 416 (including the antenna 420), the transmitting processor 415 and the controller/processor 440 in FIG. 4 of the present disclosure; the third transmitter 1502 comprises the transmitter/receiver 416 (including the antenna 420), the transmitting processor 415 and the controller/processor 440 in FIG. 4 of the present disclosure; the third receiver 1503 comprises the transmitter/receiver 416 (including the antenna 420), the receiving processor 412 and the controller/processor 440 in FIG. 4 of the present disclosure.

In embodiment 15, the second transmitter 1501 transmits first information; the third transmitter 1502 transmits second information; the third receiver 1503 receives a first radio signal; wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1.

In one embodiment, the third transmitter 1502 also transmits third information; wherein the start time for the transmission of the first radio signal is a first time, and an expected start time for a reception of the first radio signal is a second time; a sum of the first transmission timing adjustment and the second transmission timing adjustment is used to determine a length of a time interval between the first time and the second time; the third information is used to determine the second time, and the third information is transmitted through the air interface.

In one embodiment, at least the latter of the minimum step-size corresponding to the first transmission timing adjustment and the minimum step-size corresponding to the second transmission timing adjustment is related to a sub-carrier spacing of sub-carriers occupied by the first radio signal.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q2 candidate adjustments are obtained by respectively multiplying Q2 candidate integers by the minimum step-size corresponding to the second transmission timing adjustment, and the Q2 candidate integers are obtained by subtracting a first threshold from Q2 consecutive non-negative integers respectively; the second information is used in the Q2 consecutive non-negative integers to indicate consecutive non-negative integers that obtain the second transmission timing adjustment, and the first threshold is related to at least one of the Q2 or the first transmission timing adjustment;

In one embodiment, the third transmitter 1502 also transmits fourth information; the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q2 candidate adjustments are obtained by multiplying Q2 candidate integers respectively by the minimum step-size corresponding to the second transmission timing adjustment, and the Q2 candidate integers are obtained by subtracting a first threshold from Q2 consecutive non-negative integers; the second information is used in the Q2 consecutive non-negative integers to indicate consecutive non-negative integers that obtain the second transmission timing adjustment, and the first threshold is related to at least one of the Q2 or the first transmission timing adjustment; the Q2 consecutive non-negative integers belong to a first integer set, and the fourth information is used to determine the first integer set in X integer sets, the X being a positive integer greater than 1; each of the X integer sets comprises a positive integer number of non-negative integer(s), the X integer sets being predefined, and the fourth information is transmitted through the air interface.

In one embodiment, the first transmission timing adjustment is one of Q1 candidate adjustments, and the second transmission timing adjustment is one of Q2 candidate adjustments; the minimum step-size corresponding to the first transmission timing adjustment is equal to a minimum value of an absolute value of a difference of any two of the Q1 candidate adjustments, and the minimum step-size corresponding to the second transmission timing adjustment is equal to a minimum value of an absolute value of a difference of any two of the Q2 candidate adjustments, both the Q1 and the Q2 being positive integers greater than 1; the Q1 candidate adjustments are predefined; or the Q1 candidate adjustments are obtained by multiplying the Q1 candidate integers respectively by the minimum step-size corresponding to the first transmission timing adjustment; the first information indicates a candidate integer generating the first transmission timing adjustment in the Q1 candidate integers, the Q1 candidate integers being all non-negative values.

In one embodiment, the second transmitter 1501 also transmits fifth information; wherein the fifth information is used to determine whether the minimum step-size corresponding to the first transmission timing adjustment is equal to the minimum step-size corresponding to the second transmission timing adjustment, and the fifth information is transmitted through the air interface.

In one embodiment, the third receiver 1503 also receives a second radio signal; wherein the second radio signal is used to determine at least one of a start time for a transmission of the first information or a start time for a transmission of the second information, and the second radio signal is transmitted through the air interface.

The ordinary skill in the art may understand that all or part step-sizes in the above method may be implemented by instructing related hardware through a program. The program may be stored in a computer readable storage medium, for example Read-Only Memory (ROM), hard disk or compact disc, etc. Optionally, all or part step-sizes in the above embodiments also may be implemented by one or more integrated circuits. Correspondingly, each module unit in the above embodiment may be realized in the form of hardware, or in the form of software function modules. The first-type communication node or the UE or the terminal in the present disclosure includes but is not limited to mobile phones, tablet computers, laptops, network cards, low-power devices, eMTC devices, NB-IOT devices, vehicle-mounted communication equipment, aircrafts, airplanes, unmanned aerial vehicles (UAV), tele-controlled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
   receiving first information;
   receiving second information; and
   transmitting a first radio signal;
   wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the second information comprises all or part of a Random Access Response (RAR), or the second information comprises all or part of a Timing Advance (TA) update.

2. The method according to claim 1, wherein the first transmission timing adjustment is one of Q1 candidate adjustments, and the second transmission timing adjustment is one of Q2 candidate adjustments; the minimum step-size corresponding to the first transmission timing adjustment is equal to a minimum of an absolute value of a difference of any two of the Q1 candidate adjustments, and the minimum step-size corresponding to the second transmission timing adjustment is equal to a minimum of an absolute value of a difference of any two of the Q2 candidate adjustments, both the Q1 and the Q2 being positive integers greater than 1; at least the latter of the minimum step-size corresponding to the first transmission timing adjustment and the minimum step-size corresponding to the second transmission timing adjustment is related to a sub-carrier spacing of sub-carriers occupied by the first radio signal; the Q1 candidate adjustments are predefined, or obtained by multiplying Q1 candidate integers respectively by the minimum step-size corresponding to the first transmission timing adjustment-; and the Q1 candidate integers are predefined.

3. The method according to claim 1, comprising:
   receiving third information;
   wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface;
   or, comprising:
   transmitting a second radio signal; and
   receiving fifth information;
   wherein the second radio signal is used to determine at least one of a start time for a transmission of the first information or a start time for a transmission of the second information, and the second radio signal is transmitted through the air interface; the fifth information is used to determine that the minimum step-size corresponding to the first transmission timing adjustment is not equal to the minimum step-size corresponding to the second transmission timing adjustment, and the fifth information is transmitted through the air interface.

4. The method according to claim 2, wherein the Q2 candidate adjustments are obtained by Q2 candidate integers respectively multiplied by the minimum step-size corresponding to the second transmission timing adjustment, and the Q2 candidate integers are obtained by subtracting a first threshold from Q2 consecutive non-negative integers respectively; the second information is used to indicate a non-negative integer used to obtain the second transmission timing adjustment among the Q2 consecutive non-negative integers, and the first threshold is related to at least one of the Q2 or the first transmission timing adjustment; the Q2 consecutive non-negative integers are predefined, or the Q2 consecutive non-negative integers are configurable.

5. The method according to claim 4, further comprising:
   receiving fourth information;
   wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

6. A method for a second-type communication node in wireless communications, comprising:
   transmitting first information;
   transmitting second information; and
   receiving a first radio signal;
   wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the second information comprises all or part of a Random Access Response (RAR), or the second information comprises all or part of a Timing Advance (TA) update.

7. The method according to claim 6, wherein the first transmission timing adjustment is one of Q1 candidate adjustments, and the second transmission timing adjustment is one of Q2 candidate adjustments; the minimum step-size corresponding to the first transmission timing adjustment is equal to a minimum of an absolute value of a difference of any two of the Q1 candidate adjustments, and the minimum step-size corresponding to the second transmission timing adjustment is equal to a minimum of an absolute value of a difference of any two of the Q2 candidate adjustments, both the Q1 and the Q2 being positive integers greater than 1; at least the latter of the minimum step-size corresponding to the first transmission timing adjustment and the minimum step-size corresponding to the second transmission timing adjustment is related to a sub-carrier spacing of sub-carriers occupied by the first radio signal; the Q1 candidate adjustments are predefined, or obtained by multiplying the Q1 candidate integers respectively by the minimum step-size corresponding to the first transmission timing adjustment and the Q1 candidate integers are predefined.

8. The method according to claim 6, comprising:
transmitting third information;
wherein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface;
or, comprising:
receiving a second radio signal; and
transmitting fifth information;
wherein the second radio signal is used to determine at least one of a start time for a transmission of the first information or a start time for a transmission of the second information, and the second radio signal is transmitted through the air interface; the fifth information is used to determine that the minimum step-size corresponding to the first transmission timing adjustment is not equal to the minimum step-size corresponding to the second transmission timing adjustment, and the fifth information is transmitted through the air interface.

9. The method according to claim 7, wherein the Q2 candidate adjustments are obtained by Q2 candidate integers respectively multiplied by the minimum step-size corresponding to the second transmission timing adjustment, and the Q2 candidate integers are obtained by subtracting a first threshold from Q2 consecutive non-negative integers respectively; the second information is used to indicate a non-negative integer used to obtain the second transmission timing adjustment among the Q2 consecutive non-negative integers, and the first threshold is related to at least one of the Q2 or the first transmission timing adjustment; the Q2 consecutive non-negative integers are predefined or the Q2 consecutive non-negative integers are configurable.

10. The method according to claim 9, comprising:
transmitting fourth information;
wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

11. A first-type communication node for wireless communications, comprising:
a first receiver, receiving first information;
a second receiver, receiving second information; and
a first transmitter, transmitting a first radio signal;
wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the second information comprises all or part of a Random Access Response (RAR), or the second information comprises all or part of a Timing Advance (TA) update.

12. The first-type communication node according to claim 11, wherein the first transmission timing adjustment is one of Q1 candidate adjustments, and the second transmission timing adjustment is one of Q2 candidate adjustments; the minimum step-size corresponding to the first transmission timing adjustment is equal to a minimum of an absolute value of a difference of any two of the Q1 candidate adjustments, and the minimum step-size corresponding to the second transmission timing adjustment is equal to a minimum of an absolute value of a difference of any two of the Q2 candidate adjustments, both the Q1 and the Q2 being positive integers greater than 1; at least the latter of the minimum step-size corresponding to the first transmission timing adjustment and the minimum step-size corresponding to the second transmission timing adjustment is related to a sub-carrier spacing of sub-carriers occupied by the first radio signal; the Q1 candidate adjustments are predefined, or obtained by multiplying the Q1 candidate integers respectively by the minimum step-size corresponding to the first transmission timing adjustment and the Q1 candidate integers are predefined.

13. The first-type communication node according to claim 11, wherein the second receiver receives third information; herein, the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface;
or the first transmitter transmits a second radio signal; the first receiver receives fifth information; wherein the second radio signal is used to determine at least one of a start time for a transmission of the first information or a start time for a transmission of the second information, and the second radio signal is transmitted through the air interface; the fifth information is used to determine that the minimum step-size corresponding to the first transmission timing adjustment is not equal to the minimum step-size corresponding to the second transmission timing adjustment, and the fifth information is transmitted through the air interface.

14. The first-type communication node according to claim 12, wherein the Q2 candidate adjustments are obtained by Q2 candidate integers respectively multiplied by the minimum step-size corresponding to the second transmission timing adjustment, and the Q2 candidate integers are obtained by subtracting a first threshold from Q2 consecutive non-negative integers respectively; the second information is used to indicate a non-negative integer used to obtain the second transmission timing adjustment among the Q2 consecutive non-negative integers, and the first threshold is related to at least one of the Q2 or the first transmission timing adjustment; the Q2 consecutive non-negative integers are predefined or the Q2 consecutive non-negative integers are configurable.

15. The first-type communication node according to claim 14, wherein the second receiver receives fourth information; wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

16. A second-type communication node for wireless communications, comprising:
a second transmitter, transmitting first information;
a third transmitter, transmitting second information; and
a third receiver, receiving a first radio signal;
wherein the first information is used to determine a first transmission timing adjustment, the second information is used to determine a second transmission timing adjustment, and a start time for a transmission of the first radio signal is related to the first transmission timing adjustment and the second transmission timing adjustment; a minimum step-size corresponding to the first transmission timing adjustment is not equal to a minimum step-size corresponding to the second transmission timing adjustment; the first information, the second information and the first radio signal are all transmitted through an air interface; the second information comprises all or part of a Random Access Response (RAR), or the second information comprises all or part of a Timing Advance (TA) update.

17. The second-type communication node according to claim 16, wherein the first transmission timing adjustment is one of Q1 candidate adjustments, and the second transmission timing adjustment is one of Q2 candidate adjustments; the minimum step-size corresponding to the first transmission timing adjustment is equal to a minimum of an absolute value of a difference of any two of the Q1 candidate adjustments, and the minimum step-size corresponding to the second transmission timing adjustment is equal to a minimum of an absolute value of a difference of any two of the Q2 candidate adjustments, both the Q1 and the Q2 being positive integers greater than 1; at least the latter of the minimum step-size corresponding to the first transmission timing adjustment and the minimum step-size corresponding to the second transmission timing adjustment is related to a sub-carrier spacing of sub-carriers occupied by the first radio signal; the Q1 candidate adjustments are predefined, or are obtained by multiplying the Q1 candidate integers respectively by the minimum step-size corresponding to the first transmission timing adjustment and the Q1 candidate integers are predefined.

18. The second-type communication node according to claim 16, wherein the third transmitter transmits third information; herein the start time for the transmission of the first radio signal is a first time, and an expected start time for a reception of the first radio signal is a second time; a sum of the first transmission timing adjustment and the second transmission timing adjustment is used to determine a length of a time interval from the first time to the second time; the third information is used to determine the second time, and the third information is transmitted through the air interface;
or the third receiver receives a second radio signal; the second transmitter transmits fifth information; wherein the second radio signal is used to determine at least one of a start time for a transmission of the first information or a start time for a transmission of the second information, and the second radio signal is transmitted through the air interface; the fifth information is used to determine that the minimum step-size corresponding to the first transmission timing adjustment is not equal to the minimum step-size corresponding to the second transmission timing adjustment, and the fifth information is transmitted through the air interface.

19. The second-type communication node according to claim 17, wherein the Q2 candidate adjustments are obtained by Q2 candidate integers respectively multiplied by the minimum step-size corresponding to the second transmission timing adjustment, and the Q2 candidate integers are obtained by subtracting a first threshold from Q2 consecutive non-negative integers respectively; the second information is used to indicate a non-negative integer used to obtain the second transmission timing adjustment among the Q2 consecutive non-negative integers, and the first threshold is related to at least one of the Q2 or the first transmission timing adjustment; the Q2 consecutive non-negative integers are predefined or the Q2 consecutive non-negative integers are configurable.

20. The second-type communication node according to claim 19, wherein the third transmitter transmits fourth information; wherein the Q2 consecutive non-negative integers belong to a first integer set, and the fourth information is used to determine the first integer set among X integer sets, the X being a positive integer greater than 1; each of the X integer sets comprises a positive integer number of non-negative integer(s), the X integer sets being predefined, and the fourth information is transmitted through the air interface.

* * * * *